United States Patent [19]

Marmo et al.

[11] 4,311,720
[45] * Jan. 19, 1982

[54] PROCESS FOR PRODUCING A FLAVORED HEATED BEVERAGE

[75] Inventors: Don Marmo, Farmingdale; Frank L. Rocco, Richmond Hill, both of N.Y.

[73] Assignee: International Flavors & Fragrances Inc., New York, N.Y.

[*] Notice: The portion of the term of this patent subsequent to Nov. 18, 1992, has been disclaimed.

[21] Appl. No.: 206,615

[22] Filed: Nov. 13, 1980

Related U.S. Application Data

[60] Division of Ser. No. 57,270, Jul. 13, 1979, Pat. No. 4,253,473, which is a continuation-in-part of Ser. No. 17,580, Mar. 5, 1979, abandoned.

[51] Int. Cl.$^3$ ............................ A23F 3/40; A23F 5/46
[52] U.S. Cl. ...................................... 426/594; 426/597; 426/96; 426/651; 426/650; 426/534; 426/537
[58] Field of Search ................... 426/96, 594, 651, 597

[56] References Cited

U.S. PATENT DOCUMENTS 3,920,849  11/1975  Marmo et al. ................. 426/651 X
4,001,438  1/1977  Marmo et al. ................. 426/651 X

OTHER PUBLICATIONS

Swetz, Coffee Processing Technology, vol. II, 1963, Avi: Westport, Conn. pp. 50 to 55.
Furia et al. Fenaroli's Handbook of Flavor Ingredients, 2nd Ed., 1975, vol. I, CRC Press: Cleveland, pp. 262 to 264.

*Primary Examiner*—Joseph M. Golian
*Attorney, Agent, or Firm*—Arthur L. Liberman

[57] ABSTRACT

Described are hot beverage mix compositions which on admixing with a heated edible liquid yield a high flavor intensity release substantially evenly and uniformly over an extended use period, the hot beverage mix containing a mixture of (i) a non-confined flavor oil; (ii) a flavor oil which is physically entrapped in solid particles; and (iii) a suspending agent such as hydroxypropyl cellulose; the non-confined flavor oil, the entrapped flavor oil and the suspension agent being premixed prior to addition to said beverage mix.

6 Claims, 2 Drawing Figures

EFFECT OF CONCENTRATION AND KLUCEL[R] TYPE ON VISCOSITY OF WATER SOLUTIONS.

PROCESS FOR PRODUCING A FLAVORED HEATED BEVERAGE

This application is a divisional of application for U.S. Letters Patent, Ser. No. 057,270 filed on July 13, 1979, now U.S. Pat. No. 4,253,473 which, in turn, is a continuation-in-part of application for U.S. Letters Patent, Ser. No. 17,580 filed on Mar. 5, 1979, now abandoned.

BACKGROUND OF THE INVENTION

This invention relates to specific flavor compositions useful in augmenting or enhancing the aroma or taste of "hot" beverage powder mixes or smoking tobaccos or substitute smoking tobaccos. The smoking tobacco compositions as well as the "hot" beverage powder mixes when consumed in their proper respective environments have flavors with good initial strengths which flavors are controllably released (under the conditions of admixing with a hot consumable liquid, e.g. ethanol or water or combinations thereof or under conditions of smoking tobacco pyrolysis during the smoking activity) at a consistently high level over an extended period of time; and to processes for preparing such specially useful smoking tobacco and substitute smoking tobacco flavoring compositions as well as such specially useful hot beverage compositions and hot beverage flavoring compositions.

There has been considerable work performed relating to smoking tobacco or substitute smoking tobacco substances which have a flavor impact both initially and over an extended period of time during the smoking activity. Problems have arisen in attempting to create such flavor compositions for use with smoking tobacco wherein part of the flavor is available for immediate results whereas another part provides the effect of such smoking tobacco flavor or substitute smoking flavor gradually over extended periods of time. Such problems include the continuous distribution of "initial impact" and "extended release" flavor over the entire mass of the smoking tobacco or substitute smoking tobacco as well as commercial manufacture of same.

Indeed, in using menthol in flavoring tobacco, the menthol is applied on tobacco by spraying an alcoholic solution of menthol crystals thereon. The usual amount of menthol used is 0.3% by weight of the total spray composition. When menthol is used in this manner, however, the smoking articles insofar as their flavor value is concerned have unsatisfactory shelf lives.

Furthermore, there has been considerable work performed relating to hot beverage substances which have a flavor impact both initially and over an extended period of time after addition of the hot edible liquid (e.g., water, ethanol or a combination of water and ethanol) to the beverage flavor powder, for example problems have arisen in attempting to create such flavor compositions for use with beverage powders wherein part of the flavor is available for immediate results whereas another part provides the effect of such flavor gradually over extended periods of time. Such problems include the continuous distribution of "initial impact" and "extended release" flavor over the entire length of time of drinking the hot beverage as well as commercial manufacture of same.

In an analogous manner U.S. Pat. Nos. 4,001,438 and 3,920,849 have presented solutions to such problems where other consumable materials are concerned. Thus, described in U.S. Pat. No. 3,920,849 are orally utilizable compositions which may be either chewing gum compositions, chewable medicinal tablets, chewing tobacco or toothpaste having, on oral intake, a high flavor intensity release, substantially evenly and uniformly, over an extended oral utilization time in the mouth cavity; the orally utilizable compositions containing a non-confined flavor oil, a flavor oil which is physically entrapped in solid particles and a suspending agent such as silica, xanthan gum and ethyl cellulose; the non-confined flavor oil, the entrapped flavor oil and the suspension agent being premixed prior to addition to either of the chewing gum base, the chewing tobacco or the chewable medicinal tablet base or to the toothpaste base. Neither U.S. Pat. No. 3,920,849 nor U.S. Pat. No. 4,001,438 discloses the use of such materials for flavoring consumable materials which are consumed at temperatures significantly greater than ambient temperatures, e.g. smoking tobacco and hot tea, hot coffee or alcoholic beverages which include hot aqueous tea extracts or hot aqueous coffee extracts.

U.S. Pat. No. 1,526,039 teaches that if an essential oil or flavoring is combined with a chewing gum base in a finely divided condition, and the particles of the flavoring or oil are encased in a suitable covering so as not to contact the gum directly during manufacture, the deleterious effect of the flavoring on the gum is prevented or largely reduced. It is further stated therein that:

"When the emulsion is added to the gum base, it is thoroughly mixed therewith by the usual means employed for mixing the flavoring material with such base.

The production of the emulsion serves to break up the essential oil into fine particles and to encase these particles in the emulsifying material, so that when the emulsion is added to the gum mass, the essential oil to a large degree is prevented from coming into direct contact with the base, and from having deleterious action thereon."

U.S. Pat. No. 2,886,440 teaches a method of preparing a chewing gum characterized by "extended flavor perception time, true flavor character, and high degree of flavor release comprising the steps of forming a spray-dried emulsion of a volatile, water-immiscible flavoring agent encapsulated within finely divided particles of gelatin, and substantially uniformly distributing said gelatin encapsulated flavoring agent within an all-enveloping mass of a chewable gum base."

The use of separate "fixed" and "unfixed" flavor portions is also taught but there is not disclosure therein of the principle of this invention, to wit: mixing the fixed and unfixed flavor portions with a suspension agent prior to either (i) adding to a smoking tobacco or substitute smoking tobacco prior to incorporation thereof into a smoking tobacco or substitute smoking tobacco article prior to smoking or (ii) adding to a dry beverage mix formulation prior to addition of hot edible liquid thereto immediately prior to ingestion.

U.S. Pat. No. 2,886,446 teaches a chewing gum comprising (i) smaller particles of gelatin characterized by faster liberation of flavor and (ii) larger particles of gelatin characterized by slower liberation of flavor, each of the gelatin particles containing dispersed therewithin, in dried emulsion form, discrete micro-droplets of a volatile water-immiscible flavoring agent, and an all-enveloping mass of a chewable gum base within which the particles are substantially uniformly distributed whereby the flavor is released substantially evenly and uniformly over the extended chewing time.

U.S. Pat. No. 2,886,445 teaches that:

"It is now possible to obtain a flavoring composition, particularly adapted for use in chewing gum which permits attainment of a product characterized by extended flavor perception time, true flavor character, and release of a large proportion of flavoring agent. This flavoring composition comprises finely divided particles of a dried hardened gelatin emulsion containing discrete microdroplets of a volatile, water-immiscible flavoring agent. Preparation of the flavoring composition of this invention may be effected by encapsulating discrete microdroplets of volatile, water-immiscible flavoring agent within finely divided particles of a dried emulsion of hardened gelatin."

U.S. Pat. No. 2,886,449 teaches:

"A chewing gum containing a flavoring composition characterized by an extended flavor perception time, true flavor character, controlled release of a large portion of flavoring agent, and reduction in amount of flavor oil required (which) may be prepared by the process comprising forming a gelatin-coacervated flavor, and substantially uniformly distributing said gelatin-coacervated flavor within an all-enveloping mass of a chewable gum base. The product chewing gum ... comprises ... finely divided particles of coacervated gelatin containing a water-immiscible flavoring agent therewithin and an all-enveloping mass of a chewing gum base within which the particles are substantially distributed."

The utilization of sustained released flavor containing capsules in such materials as chewing gum and medicinal tablets is also taught in British Pat. No. 1,205,764.

The use of sustained release flavor capsules in conjunction with polyethylene glycols (which are taught to be employed to desolventize the capsules) is set forth in British Pat. No. 1,318,799.

The use of hydroxypropyl cellulose contained in microcapsules especially for pressure sensitive copying paper is disclosed in Japanese Pat. No. J 7 9000 426 claiming a priority of U.S. application Ser. No. 480,956 filed on June 19, 1974 and assigned to the Mead Corporation. In said Japanese Pat. No. J7 9000 426 it is indicated that oil-containing microcapsules especially for pressure sensitive copying paper are prepared by (a) preparing an aqueous solution of hydroxypropyl cellulose containing reactive hydroxyl groups and having a decreasing water solubility as the temperature increases; (b) then preparing a solution of an oil soluble cross-linking agent for the hydroxypropyl cellulose in an oil; then emulsifying the oil solution in the aqueous solution to form an emulsion containing droplets of the oil solution; (c) then heating the emulsion to a temperature above the precipitation temperature of the hydroxypropyl cellulose so that hydroxypropyl cellulose precipitates over the droplets to form solid microcapsule walls and (d) finally maintaining the emulsion at this temperature until the microcapsule walls become insoluble in water and in the oil. Nothing in the Japanese Pat. No. J7 9000 426 discloses the creation of a smoking tobacco composition or a powdered hot beverage composition wherein the flavor thereof is controllably released during the smoking activity or beverage ingestion activity (as the case may be) at a consistently high level over an extended period of time.

In U.S. Pat. No. 3,623,489 the formation of a shredded tobacco material having intimately admixed therewith a micro encapsulated synthetic clove flavoring material (wherein the capsules are of such a size as to create an audible crackling sound when burned) and the incorporation thereof into smoking articles such as cigarettes and cigars is disclosed. It is further disclosed that these capsules may also contain a tobacco flavor enhancer.

U.S. Pat. No. 3,753,730 issued on Aug. 21, 1973 discloses processes for altering the flavors of particulate grain products comprising applying a composition comprising a flavoring agent, an edible cold water insoluble film former and a vehicle to a particulate grain product; drying the distributed composition to form a flavor containing film on the grain product; and then optionally, distributing the coated flavored grain through a large mass of uncoated grain particles.

German Offenlegungsschrift No. 2,826,042 published on Jan. 4, 1979 discloses a condiment consisting of a lemon flavored salt prepared by mixing salt and a lemon oil powder and spraying the resulting mixture with lemon oil. More particularly, the salt is admixed with (a) from 0.1 up to 0.5 weight percent of salt of a terpene-free lemon oil bonded to a powdery carrier and (b) terpene-free liquid lemon oil. The condiment is prepared by mixing the dry salt with component a, spraying the mixture with component b and mixing through a screw conveyor.

Hydroxypropyl cellulose itself is described in particular in three publications:
a. Hercules/Klucel ®/hydroxypropyl cellulose published by Hercules Incorporated of Wilmington, Del.;
b. Klug, Vol. 24, No. 51, Food Technology, January, 1970, page 51 entitled: "Functional Helpmate to Development ... Hydroxypropyl Cellulose/a New Water Soluble Cellulose Polymer"; and
c. U.S. Pat. No. 3,278,521, issued on Oct. 11, 1966 entitled: "Hydroxypropyl Cellulose and Process"-/Inventor: Klug.

However, the prior art does not set forth commercially feasible processes for creating a smoking tobacco composition of substitute smoking tobacco composition containing a flavoring composition which provides instantaneous evenly distributed flavor release, extended continuous, non-interrupted flavor perception time periods and at the same time provides during the smoking activity, extended constant flavor impact; which is provided by our invention; nor does the prior art teach the creation of a hot beverage mix composition which on admixing with a heated edible liquid yields a high flavor intensity release substantially evenly and uniformly over an extended use period.

OBJECTS OF THE INVENTION

Figure 1:
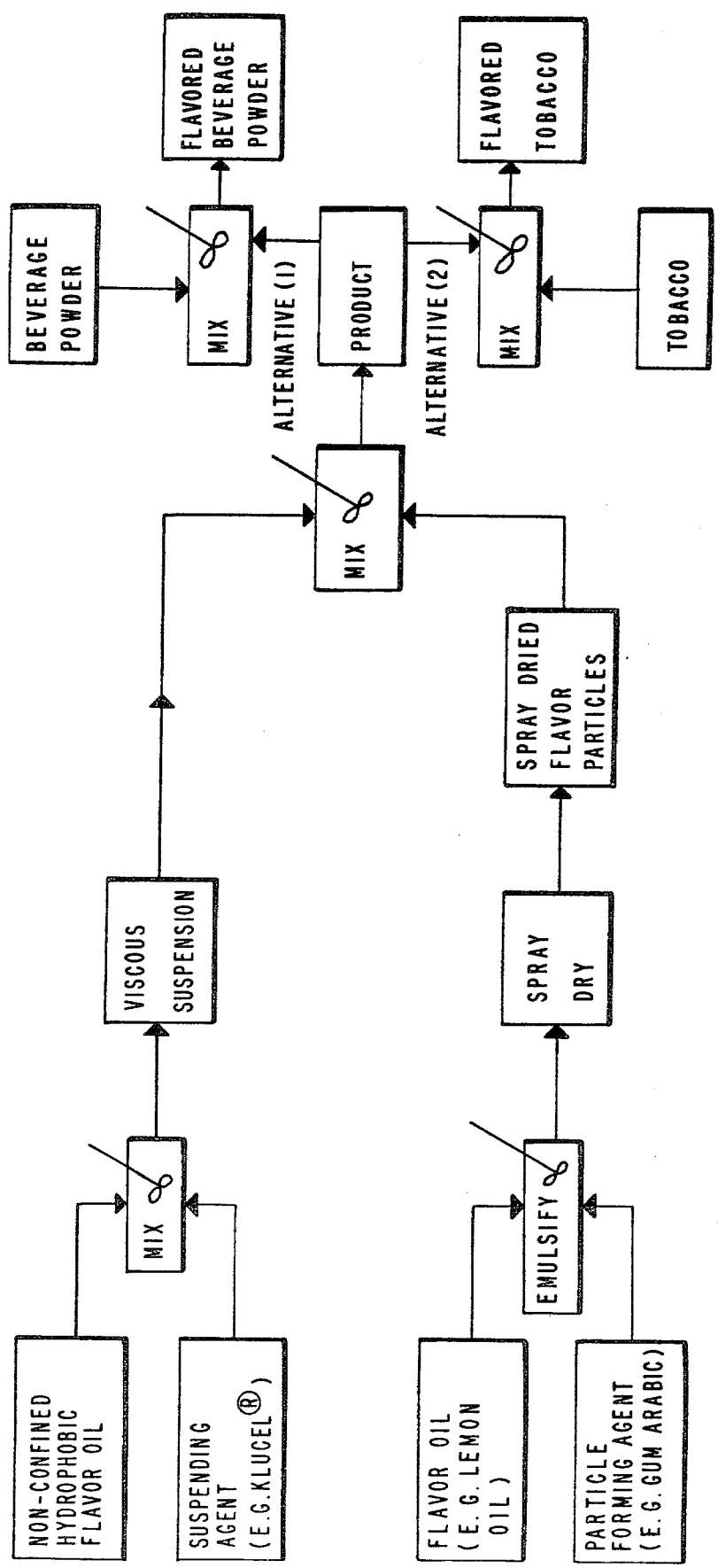
FIG. 1 sets forth a block diagram flow sheet indicating the preparation of the flavored beverage powder as well as the flavored smoking tobacco of our invention.

It is an object of this invention to provide a smoking tobacco composition or substitute smoking tobacco composition containing a flavoring composition characterized by (i) an almost instantaneous flavor perception prior to smoking and on smoking and (ii) over an extended period of time on smoking, controlled constant and continuous non-interrupted high impact flavor release.

A second object of this invention is to increase the total amount of flavor release during the smoking activity of the smoking article containing the herien described flavoring composition.

A third object of this invention is to provide a hot beverage mix composition which on admixing with a heated edible liquid yields a high flavor intensity release substantially evenly and uniformly over an extended use period.

Further objects of this invention will be apparent to those skilled in the art from the following detailed description of the invention.

THE INVENTION

This invention relates to flavor compositions for use in smoking tobacco or substitute smoking tobacco compositions which are, in turn, used in smoking tobacco articles or substitute smoking tobacco articles such as cigarettes and cigars. The said smoking tobacco or substituted smoking tobacco has a flavor with good evenly distributed initial strength and this flavor is controllably released with continuous non-interrupted high flavor impact over an extended period of time during the smoking activity; and to processes for preparing such flavoring compositions.

This invention also relates to hot beverage mix compositions which on admixing with a heated edible liquid such as water or ethanol (foodgrade) yield a high flavor intensity release substantially evenly and uniformly over an extended use period, the hot beverage mix containing a mixture of (i) a nonconfined flavor oil; (ii) a flavor oil which is physically entrapped in solid edible particles and (iii) a suspending agent such as hydroxypropyl cellulose, ethyl cellulose, silica or xanthan gum, the non-confined oil, the flavor oil which is physically entrapped in solid particles and suspending agent being premixed prior to addition to said beverage mix composition.

As used herein with regard to tobacco flavors the terms "alter" and "modify" in their various forms mean "supplying or imparting flavor character or note to otherwise bland tobacco, tobacco substitutes, or tobacco flavor formulations or augmenting the existing flavor characteristic where a natural flavor is deficient in some regard or supplementing the existing flavor impression to modify its quality, character or taste".

As used herein with regard to hot beverage flavor substances, the terms "alter" and "modify" in their various forms mean "supplying or imparting flavor character or note to otherwise bland dry or substantially dry hot beverage mix compositions or beverage mix flavor formulations or augmenting the existing flavor characteristics where a natural flavor is deficient in some regard or supplementing the existing flavor impression to modify its quality character or taste".

As used herein, the term "enhance" is intended to mean the intensification (without change in kind of quality of aroma or taste) of one or more taste and/or aroma nuances present in the organoleptic impression of tobacco or a tobacco substitute or a tobacco flavor or in the organoleptic impression of a hot beverage mix which is dry or substantially dry or a flavor for said hot beverage mix such as a lemon or tea or mint flavor.

Our invention thus provides (1) an organoleptically improved smoking tobacco product and additives therefor, as well as methods of making same wich overcome specific problems heretofore encountered in which improved smoking tobacco compositions having a flavor with good initial strength and having a flavor which is controllably released during the smoking activity at a consistently high level over an extended period of time prior to smoking and in the main and sidestreams on smoking are created or enhanced and may be readily controlled and maintained at desired uniform levels regardless of variations in the tobacco components of the blend and, in addition, (2) an organoleptically improved "hot" beverage powder which is dry or substantially dry as well as methods of making same which overcome specific problems heretofore encountered in which improved hot beverage dry or substantially dry compositions having a flavor with good initial strength and having a flavor which is controllably released during the injection activity at a consistently high level over an extende period of time are created or enhanced and may be readily controlled and maintained at desired uniform levels regardless of variations in the components of the hot beverage mix blend.

This invention further provides improved tobacco additives and methods whereby various nuances prior to smoking and in the main and sidestreams on smoking may be imparted to smoking tobacco products and may be readily varied and controlled to produce the desired uniform flavor characteristics wherein the flavor has a good initial strength and wherein the flavor is controllably released during the smoking activity of a consistently high level over an extended period of time.

This invention in addition provides improved additives for beverage powders for incorporation with hot liquids in order to produce "hot" beverages and methods whereby various nuances in the hot beverage flavor may be imparted to such products and may be readily varied and controlled to produce the desired uniform flavor characteristics wherein the flavor has a good initial strength and wherein the flavor is controllably released during injestion of the hot beverage of a consistently high level over an extended period of time.

Figure 2:
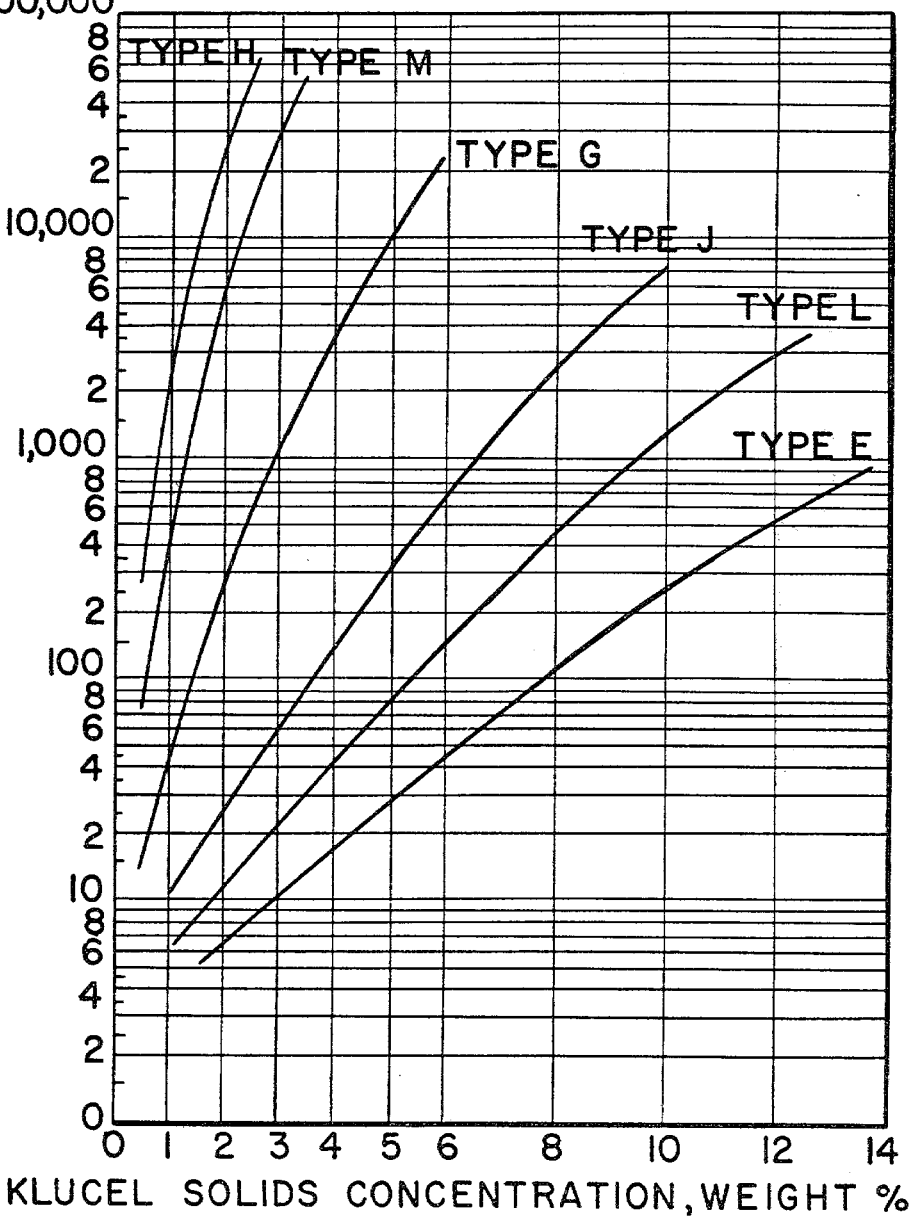
FIG. 2 sets forth a graph indicating the Klucel ® brand of hydroxypropyl cellulose solids concentration (weight percent) versus Brookfield viscosity at 25° C. in centipoyses for types E, L, J, G, M and H Klucel ® hydroxypropyl cellulose materials. Thus, FIG. 2 indicates the effect of concentration in Klucel ® type on viscosity of water solutions.

Thus, it has been found that it is now possible to obtain a smoking tobacco composition or substitute smoking tobacco composition containing a flavoring composition which provides an almost instantaneous flavor release prior to smoking and on smoking, in extended high intensity constant flavor perception time during smoking, true flavor character and controlled release of the major proportions of flavoring agent initially present in the flavoring composition. It has been further found that it is now possible to obtain a hot beverage powder composition containing a flavoring composition which provides an almost instantaneous flavor release immediately on adding the powder to a hot liquid such as alcohol or water and on injestion, in extended high intensity constant flavor perception time during injection, true flavor character and controlled release of the major proportions of flavoring agent initially present in the flavor composition. These flavoring compositions of our invention consist essentially of:

a. From about 3 up to about 7 parts by weight of a nonconfined hydrophobic flavor oil;

b. From about 3 up to 7 parts by weight of a hydrolytically releasable flavor oil physically entrapped in an edible solid material, said solid material having a particle size of from about 5 microns up to about 400 microns, said physically entrapped flavor oil being organoleptically compatible with said non-confinred hydrophobic flavor oil; and c. From about 0.1 up to about 1 part by weight of the solid suspending agent selected from the group consisting of hydroxypropyl cellulose having a molecular weight of from about 50,000 up to about 800,000, a structure as follows:

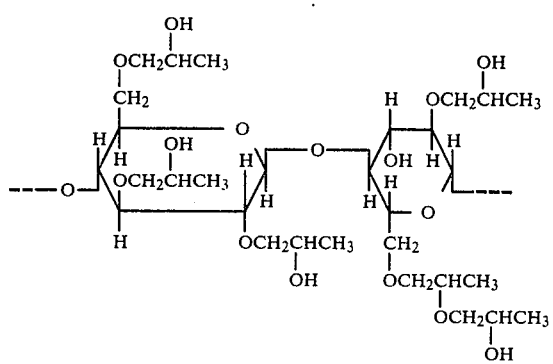

having a particle size such that 95% of the particle is passed through 30 mesh screens and 99% of the particles are passed through 20 mesh screens and having a viscosity defined according to FIG. 2; or colloidal silica, xanthan gum and ethyl cellulose having a particle size of from about 0.004 up to about 0.130 microns, a surface area of from about 100 up to about 500 m²/gm and a density of from about 1.0 up to about 4.0 lbs./cu.ft.

Preparation of the flavoring compositions employed in the smoking tobacco or substitute smoking tobacco compositions or in the hot beverage powder compositions of our invention may be effected by:

1. Admixing a. From about 3 up to about 7 parts by weight of a non-confined hydrophobic flavor oil; and b. From about 0.1 up to about 1 part by weight of a solid suspending agent selected from the group consisting of hydroxypropyl cellulose having a molecular weight of from about 50,000 up to about 800,000, having a structure:

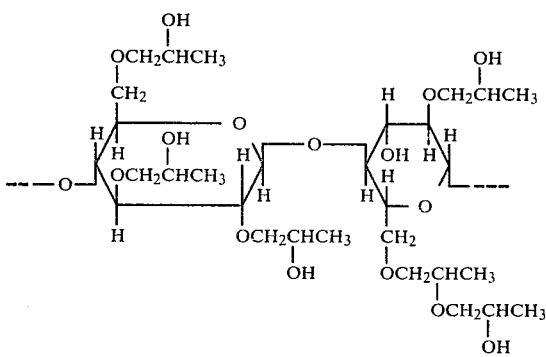

having a particle size such that 95% of the particles are passed through 30 mesh screens and 99% of the particles are passed through 20 mesh screens; having a viscosity defined according to FIG. 2; and colloidal silica, xanthan gum and ethyl cellulose having a particle size of from about 0.004 up to about 0.130 microns, a surface area of from about 100 up to about 500 m²/gm and a density of from about 1.0 up to about 4.0 lbs/cu.ft., thereby forming a first suspension; and then 2. Admixing said first suspension with from about 3 up to about 7 parts by weight of a hydrolytically releasable flavor oil physically entrapped in an edible solid material, said solid material having a particle size from about 5 microns up to about 400 microns thereby forming a second suspension, said physically entrapped flavor oil being organoleptically compatible in either (i) a tobacco medium or in a substitute tobacco medium useful for fabrication of smoking articles, or (ii) a flavored hot beverage powder and ultimate beverage into which said flavored hot beverage powder is incorporated, with said non-confined hydrophobic flavor oil.

The smoking tobacco or substitute smoking tobacco composition of our invention or the hot beverage powder of our invention may be prepared by the steps of:

1. Admixing a. From about 3 up to about 7 parts by weight of a non-confined hydrophobic flavor oil; and b. From about 0.1 up to about 1 part by weight of a solid suspending agent selected from the group consisting of hydroxypropyl cellulose having a molecular weight of from about 50,000 up to about 800,000, having a structure:

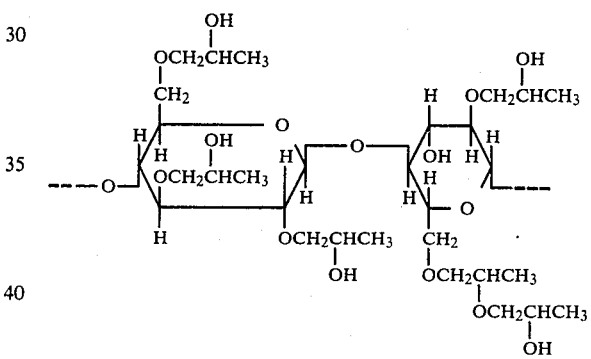

having a particle size such that 95% of the particles are passed through 30 mesh screens and 99% of the particles are passed through 20 mesh screens; having a viscosity defined according to FIG. 2; and colloidal silica, xanthan gum and ethyl cellulose having a particle size of from about 0.004 up to about 0.130 microns, a surface area of from about 100 up to about 500 m²/gm and a density of from about 1.0 up to about 4.0 lbs/cu.ft., thereby forming a first suspension (if desired an additional product stabilizer such as propylene glycol may also be incorporated into the mixture);

2. Admixing said first suspension with from about 3 up to about 7 parts by weight of a hydrolytically releasable flavor oil physically entrapped in an edible solid material, said solid material having a particle size of from about 5 microns up to about 400 microns (preferably from 70 up to 300 microns) thereby forming a second suspension, said physically entrapped flavor oil being organoleptically compatible with said non-confined hydrophobic flavor oil; and 3. Substantially uniformly distributing said second suspension within either (i) the interstices of shredded smoking tobacco or a smoking tobacco substitute or (ii) the body of a "hot" beverage powder.

The solid physical entrapment material used to entrap the thermally-hydrolytically releasable flavor oil may be of various convenient physical shapes; e.g., capsules having gelatin shells; particles of dextrin and/or modified food starch and/or gum acacia capable of adsorbing and/or adsorbing and retaining flavor oils until either (a) subjected to smoking activity or to the heat transferred from smoking burning tobacco to tobacco which is not being smoked but being subjected to the organoleptic senses of the smoker, e.g., taste and smell or (b) subjected to heat transferred from hot beverage liquid (e.g., liquid having a temperature of from 50° C. up to about 100° C.) to the "hot" beverage powder being admixed with said "hot" liquid, said liquid being used to facilitate injestion of the beverage such as coffee or tea.

In carrying out the process of our invention, sustained release flavors are prepared by combining non-confined flavor oils with encapsulated or physically entrapped flavor oils. These combinations are fashioned so that the free oil is bound in a network of physically entrapped flavor and suspending agent. The thixotropic pastes, or free flowing powders which result are products where the unconfined flavor oil, the "encapsulated" or physically entrapped flavor oil and suspending agent are held together by physical forces.

When acacia is used as the entrapment agent for the physically entrapped flavor oil, a suitable product results when, for example, the following combination is prepared:

| Ingredient | Parts by Weight |
|---|---|
| Spray dried menthol on gum acacia | 35 |
| Ethyl Alcohol (95% USP) | 29 |
| Menthol crystal, Brazilian | 35 |
| KLUCEL ® HF (brand of hydroxypropyl cellulose manufactured by Hercules Inc. of Wilmington, Delaware having a molecular weight of about 800,000 and a viscosity defined according to FIG. 2) | 1 |

The KLUCEL ® HF is dispersed in the alcohol and allowed to hydrate. The menthol crystals are then dissolved in the alcohol. The spray dried menthol-gum acacia combination is then dispersed in the solution. A viscous suspension results. This suspension is then diluted with 95% USP ethyl alcohol and an amount equivalent to 0.3% methanol is added to tobacco.

Two sets of 75 cigarettes each are prepared. One set contains 0.3% menthol applied in the traditional manner by spraying an alcoholic solution onto the tobacco. The other set contains 0.3% menthol in the product as set forth in Table I above. The two sets of cigarettes are prepared for comparative evaluations and yield the following evaluations:

| DAYS AFTER PREPARATION | DIFFERENCE |
|---|---|
| 7 | No difference |
| 21 | Slight Preference for product of Table I |
| 34 | Great Preference for product of Table I |

When menthol is put in solution with a film forming agent such as KLUCEL ® HF, this agent will provide a greater barrier to retard the loss of the menthol, than if the menthol is simply added alone to the tobacco. The inclusion of a spray dried menthol, e.g. spray dried on gum arabic, will serve to greatly extend the shelf life. The vehicle used in the menthol product, ethyl alcohol, is a "non-solvent" for the gum arabic carrier of the spray dried menthol. This spray dried component of the menthol product will therefore remain intact until such time as it is released by ignition of the tobacco during the smoking activity.

The film forming agent selected must be soluble in the vehicle used, and it should provide sufficient viscosity so that after the addition of the spray dried component, a stable suspension results. The addition of menthol and spray dried menthol, e.g., spray dried gum arabic holding the menthol, added separately without a film forming agent results in an unsatisfactory product.

This is due to differences in bulk density of the tobacco or the dry beverage powder (as the case may be) and the spray dried menthol, resulting in segregation of these two different components.

In addition to the use of such flavorants as menthol for tobacco or for flavoring or augmenting or enhancing the flavor or aroma of a "hot" beverage powder, there exists a potential use for other flavors for tobacco and in hot beverage powders, such as lemon. Thus, the following lemon flavored produced is prepared:

TABLE III

| ngredients | Parts by Weight | |
|---|---|---|
| KLUCEL ® HF (Hercules brand of hydroxypropyl cellulose) | 0.8 | |
| Ethyl alcohol 95% (food grade) | 39.2 | |
| Lemon flavor containing the following ingredients: | 20.0 | |
| Methyl Heptenone | (0.50 | parts per 1000 of lemon flavor) |
| Terpineol | (1.00 | parts per 1000 of lemon flavor) |
| Linalool | (1.00 | parts per 1000 of lemon flavor) |
| n-Decanal | (1.25 | parts per 1000 of lemon flavor) |
| n-Octanal | (1.25 | parts per 1000 of lemon flavor) |
| Geranyl Acetate | (1.75 | parts per 1000 of lemon flavor) |
| Citral | (60.00 | parts per 1000 of lemon flavor) |
| Oil of lemon, cold pressed | (100.00 | parts per 1000 of lemon flavor) |
| Orange Terpenes | (833.25 | parts per 1000 of lemon flavor) |
| Spray Dried Lemon Flavor (or gum arabic) containing the following ingredients: | 40.0 | |
| Methyl Heptenone | (0.50 | parts per 1000 of lemon flavor) |
| Terpineol | (1.00 | parts per 1000 of lemon flavor) |
| Linallol | (1.00 | parts per 1000 of lemon flavor) |
| n-Decanal | (1.25 | parts per 1000 of lemon flavor) |
| n-Octanal | (1.25 | parts per 1000 of lemon flavor) |
| Geranyl Acetate | (1.75 | parts per 1000 of lemon flavor) |
| Citral | (60.00 | parts per 1000 of lemon flavor) |
| Oil of lemon, cold pressed | (100.00 | parts per 1000 of lemon flavor) |
| Orange Terpenes | (833.25 | parts per 1000 of lemon flavor) |

Another area where this type of flavoring system is of value is in the flavoring of tea.

The same shelf life problems exist when liquid flavors are sprayed onto tea. Attempts have been made to prepare flavored particles of the same bulk density as tea to prevent segregation of the tea and flavor particles.

Flavor systems consisting of liquid flavor, film forming agent, and spray dried flavor, are prepared and added to a tea pre-mix, representing 5–10% of the complete tea blend to provide sufficient flavor for the complete blend.

Flavors such as lemon, mint, spice, orange and rum are presently ascertained to be useful.

The following is an example of a mint flavored system within the scope of this invention:

TABLE IV

| Ingredient | Parts by Weight |
| --- | --- |
| Shellac, #3 confectionary produced by William Zinsser & Co. of 521 West 58th St. New York New York | 25.00 |
| Ethyl alcohol 95% USP | 25.00 |
| KLUCEL® HF (Hercules brand of hydroxypropyl cellulose, | 0.25 |
| Mint flavor having the following formulation: | 20.00 |
| Eugenol | (1.00 parts per 1000 of mint flavor) |
| Methyl salicylate | (1.00 parts per 1000 of mint flavor) |
| Anethole | (2.00 parts per 1000 of mint flavor) |
| Spearmint Oil | (25.00 parts per 1000 of mint flavor) |
| Menthol | (21.00 parts per 1000 of mint flavor) |
| L-carvone | (50.00 parts per 1000 of mint flavor) |
| Mint spray dried flavor (gum arabic) having the following formulation: | 29.75 |
| Eugenol | (1.00 parts per 1000 of mint flavor) |
| Methyl salicylate | (1.00 parts per 1000 of mint flavor) |
| Anethol | (2.00 parts per 1000 of mint flavor) |
| Spearmint Oil | (25.00 parts per 1000 of mint flavor) |
| Menthol | (21.00 parts per 1000 of mint flavor) |
| L-carvone | (50.00 parts per 1000 of mint flavor) |

In carrying out one particular aspect of the process of this invention a solution of physical entrapment agent, e.g., gelatin, modified food starch, dextrin, or gum acacia, may be formed containing 5 to 100 parts of entrapment agent per hundred parts of water, the latter being preferably at a temperature of 90° F. to 180° F. during dissolution of the entrapment agent.

The solution is allowed to cool preferably to 33° F. to 75° F. and is then solidified by spray-drying.

Prior to the spray-drying of the solution of entrapment agent and preferably after cooling to 80° F. to 140° F. the desired volatile, water-immiscible flavoring agent may be added to the solution and homogenized to form an emulsion. The flavoring agents which may be employed include menthol, oil of peppermint, tea flavor, cherry flavor, orange oil, lemon flavor, lime flavor oil of spearmint, fruit essences, licorice, spice oils and the like. The selected flavoring agent may be added to an amount equal to 10 to 100 percent of the weight of the entrapment agent. Examples of the physically entrapped flavor material utilizable in our invention are:

a. Cherry flavor oil physically entrapped in dextrin;
b. Cherry flavor oil encapsulated in gelatin capsules;
c. Cherry flavor oil entrapped in gum acacia;
d. Lemon flavor oil physically entrapped in dextrin;
e. Lemon flavor oil encapsulated in gelatin capsules;
f. Lemon flavor oil entrapped in gum acacia;
g. Lime flavor oil physically entrapped in dextrin;
h. Lime flavor oil encapsulated in gelatin capsules;
i. Lime flavor oil entrapped in gum acacia;
j. Peppermint flavor oil physically entrapped in dextrin;
k. Peppermint flavor oil encapsulated in gelatin capsules;
l. Peppermint flavor oil entrapped in gum acacia;
m. Oil of wintergreen physically entrapped in dextrin;
n. Oil of wintergreen encapsulated in gelatin capsules;
o. Oil of wintergreen entrapped in gum acaia;
p. Orange flavor oil physically entrapped in dextrin;
q. Orange flavor oil encapsulated in gelatin capsules;
r. Orange flavor oil entrapped in gum acacia;
s. Cherry flavor oil entrapped in modified food starch;
t. Lemon flavor oil entrapped in modified food starch;
u. Lime flavor oil entrapped in modified food starch;
v. Peppermint flavor oil entrapped in modified food starch;
w. Oil of wintergreen entrapped in modified food starch; and
x. Orange flavor oil entrapped in modified food starch;
y. Dextrin menthol entrapped in gelatin capsules;
z. Menthol entrapped in gum acacia;
ba. Tea flavor trapped in gelatin capsules;
bb. Tea flavor trapped in gum acacia;
bc. Tea flavor entrapped in dextrin;
ca. Coffee flavor entrapped in gelatin capsules;
cb. Coffee flavor entrapped in gum acacia;
cc. Coffee flavor entrapped in dextrin.

When the emulsion of flavoring agent in solution of entrapment agent is solidified as by spray-drying the resultant spray-dried emulsion may have the flavoring agent for tobacco or a "hot" beverage powder such as an "instant tea" (as described more particularly in Canadian Pat. No. 1,039,563, particularly examples 13 and 14 on page 19 of the specification of Canadian Pat. No. 1,039,563) or an "instant coffee" powder using, for example, the coffee flavor as more particularly described in U.S. Pat. No. 4,145,354, issued on Mar. 20, 1979 (particularly with reference to Example IV at column 29, lines 1–35 of U.S. Pat. No. 4,145,354) or an instant tea beverage as described more particularly in German Auslegeschrift No. 1,692,282 or United Kingdom Pat. No. 1,203,729, in the form of discrete microdroplets encapsulated in very fine particles of dried gelatin or it may have the flavor oil absorbed into solid particles as is the case with gum arabic or gum acacia. The solid spray-dried emulsion will be in powder form which may be 5 microns to 400 microns in particle diameter. The preferred size to 70–300 microns in particle diameter.

Formation of a flavored tobacco or a flavored "hot" beverage powder, for example, may be effected by:

1. Admixing
a. From about 3 up to about 7 parts by weight of a non-confined hydrophobic flavor oil such as peppermint oil; and
b. From about 0.1 up to about 1 part by weight of a solid suspending agent selected from the group consisting of hydroxypropyl cellulose having a molecular weight of from about 50,000 up to about 800,000, having a structure:

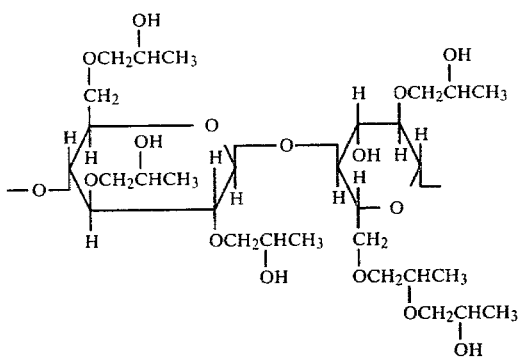

having a particle size such that 95% of the particles are passed through 30 mesh screens and 99% of the particles are passed through 20 mesh screens; having a viscosity defined according to FIG. 2; and colloidal silica, xanthan gum and ethyl cellulose having a particle size of from about 0.004 up to about 0.130 microns, a surface area of from about 100 up to about 500 m²/gm and a density of from about 1.0 up to about 4.0 lbs/cu.ft., thereby forming a first suspension;

2. Admixing said first suspension with from about 3 up to about 7 parts by weight of a hydrolytically releasable flavor oil such as peppermint oil physically entrapped in an edible solid material said solid material having a particle size of from about 5 microns up to about 400 microns (outside diameter) thereby forming a second suspension said physically entrapped flavor oil being organoleptically compatible with said non-confined hydrophobic flavor oil (e.g., menthol being the physically entrapped oil and peppermint oil being the non-confined hydrophobic flavor oil); and then either 3(a) Substantially uniformly distributing said second suspension within an all-enveloping mass of shredded tobacco, e.g., shredded Virginia tobacco.

3(b) Substantially uniformly distributing said second suspension as by admixing said second suspension in a previously flavored or unflavored "hot" beverage powder as, for example, described in United Kingdom Pat. No. 1,203,729.

A preferred tobacco composition has 0.5–3.0% of flavoring composition in 97–99.5% by weight of tobacco, more preferably, 1 percent flavoring composition: 99 percent tobacco (based on dry weight of tobacco). Typically the tobacco will be burley, turkish, Virginia, or a suitable substitute therefor (e.g., dried lettuce leaves). In addition to the above-mentioned flavors useful in our invention, other flavoring and aroma additives may be added to the smoking tobacco materials or substitutes therefor either separately or in admixture with the above-mentioned flavor materials. These additional materials are as follows:

I. Synthetic Materials

Beta-ethyl-cinnamaldehyde;
Eugenol;
Dipentene;
Beta-Damascenone;
Beta-Damascone;
Maltol;
Ethyl Maltol;
Delta undecalactone;
Delta decalactone;
Benzaldehyde;
Amyl acetate;
Ethyl butyrate;
Ethyl valerate;
Ethyl acetate;
Beta-cyclohomocitral;
2-Hexenol-1;
2-methyl-5-isopropyl-1,3-nonadiene-8-one;
2,6-Dimethyl-2,6-undecadiene-10-one;
2-Methyl-5-isopropyl acetophenone;
2-Hydroxy-2,5,5,8a-tetramethyl-1-(2-hydroxyethyl)-decahydronaphthalene;
Dodecahydro-3a,6,6,9a-tetramethylnaphtho-(2,1-b)-furan;
4-Hydroxy hexanoic acid, gamma lactone;
Polyisoprenoid hydrocarbons defined in Example V of U.S. Pat. No. 3,589,372 issued on June 29, 1971; and
One or more 5-acyl-2-(furfurylthio)-dihydro-2,5-dialkyl-3-[2H]furanones having the generic structure:

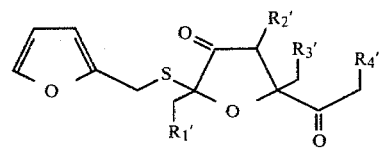

wherein $R_1'$, $R_2'$, $R_3'$ and $R_4'$ are each the same or different and each represents hydrogen or methyl.

II. Natural Oils

Celery seed oil;
Coffee extract;
Bergamot Oil;
Cocoa extract;
Nutmet oil;
Origanum oil.

An aroma and flavoring concentrate containing the mixture of liquid non-confined flavor and physically entrapped flavor of our invention and if desired one or more of the above indicated additional flavoring additives confined and/or non-confined may be added to the smoking tobacco material, to the filter or to the leaf or paper wrapper. The smoking tobacco material may be shredded, cured, cased and blended tobacco material or reconstituted tobacco material or tobacco substitutes (e.g., lettuce leaves) or mixtures thereof. The proportions of flavoring additives (total) may be varied in accordance with taste but insofar an enhancement or the imparting of natural, sweet or other types of desirable tobacco flavor or aroma nuances are concerned, we have found that satisfactory results are obtained if the proportion by weight of the sum total of all flavor additives both confined and non-confined of our invention to smoking tobacco material is between 250 ppm and 1,500 pm (0.025%–0.15%) of the active ingredients to the smoking tobacco material.

Any convenient method for incorporating the mixture of confined and non-confined flavor materials may be employed. Thus, the confined and non-confined additives of our invention taken together with hydroxypropyl cellulose having a molecular weight of from about 50,000 up to about 800,000 or silica or ethyl cellulose or xanthan gum and a suitable solvent such as food-grade ethanol may be made up into a paste and the resulting solution may be spread on the cured, cased and blended tobacco material or the tobacco material may be dipped into such paste. Under certain circumstances the said paste taken alone or taken further together with other flavoring additives as set forth above may be applied by means of a suitable applicator which is a brush or roller on the paper or leaf wrapper for the smoking product, or it may be applied to the filter by either spraying or dipping or coating.

Furthermore, it will be apparent that only a portion of the tobacco or substitute therefor need be treated and the thus treated tobacco may be blended with other tobaccos before the ultimate tobacco product is formed. In such cases, the tobacco treated may have the mixture of confined and non-confined flavor additives with the carrier, e.g. hydroxypropyl cellulose of our invention in excess in the amounts or concentrations above indicated so that when blended with other tobaccos the final product will have the percentage within the indicated range.

In accordance with one specific example of our invention, an aged, cured and shredded domestic burley tobacco is coated with a paste made up as follows:

Spray dried menthol on gum arabic (35 parts by weight; 3.0% menthol in gum arabic);
Foodgrade ethanol 95% USP, 29 parts by weight;
Menthol crystals, Brazilian, 35 parts by weight;
KLUCEL® GF brand of hydroxypropyl cellulose manufactured by Hercules Corp. of Wilmington, Del. (molecular weight: about 300,000) 1.0 parts by weight.

Thereafter, the alcohol is removed by evaporation and the tobacco is manufactured into cigarettes by the usual techniques. The resulting cigarettes, when treated as indicated, have desired and pleasing aromas (with delicate, pleasant esthetic menthol nuances) which are detectable in the main and sidestreams when the cigarette is smoked. The resulting aroma may also have green, sweet, fruity, floral or Virginia tobacco-like nuances prior to smoking and in the main and sidestreams on smoking if other materials as indicated above are added, e.g., 1-acetyl-3,3-dimethyl-cyclohexane derivatives as specified in U.S. application for Letters Patent Ser. No. 834,501 filed on Sept. 19, 1977.

While our invention is particularly useful in the manufacture of smoking tobacco such as cigarette tobacco, cigar tobacco and pipe tobacco, other tobacco products formed from sheeted tobacco dust or fines may also be used. Likewise, the mixture of confined and non-confined flavor additives taken further together with the suspending agent such as hydroxypropyl cellulose or ethyl cellulose or silica or xanthan gum or mixtures thereof of our invention can be incorporated with materials such as filter tip materials, seam paste, packaging and the like which are used along with tobacco to form a product adapted for smoking. Furthermore, the mixture of confined and non-confined flavors taken together with the carrier such as hydroxypropyl cellulose of our invention can be added to certain tobacco substitutes of natural or synthetic origin, e.g., dried lettuce leaves, and accordingly by the term "tobacco" and the term "smoking tobacco" as used throughout the specification is meant any composition intended for human consumption by smoking or otherwise, whether composed of tobacco, plant parts or substitute materials or both.

Although the smoking tobacco and tea and lemon flavored products (hereinafter referred to as "orally utilizable compositions") of this invention can be prepared from a single flavoring agent, e.g., lemon flavor or menthol flavor, it is possible to extend the range of properties of the orally utilizable composition by use of combinations of two or more spray-dried flavoring compositions and two or more non-confined flavors which may or may not be different but which are organoleptically compatible with the physically entrapped flavors. For example, it is possible to separately prepare spray-dried flavoring compositions from gelatins of various Blooms and then to add these compositions to the first suspension of flavor oil and suspension agent (e.g. hydroxypropyl cellulose) and also add spray-dried flavor to such material as tobacco, separately. Thus, such an orally utilizable material may, for example, contain a mixture of flavoring compositions prepared from a low Bloom gelatin (characterized by a rapid flavor release) and a high Bloom gelatin (characterized by a longer flavor release) as well as non-confined flavor oil (very rapid release). The properties of these resultant orally utilizable material will be intermediate to the properties obtained from each of the flavoring compositions when used separately. Specifically, if a flavoring composition formed from 50 Bloom gelatin is mixed with a flavoring composition formed from 200 Bloom gelatin, and the mixture is both (i) added to a flavor oil and suspension agent which composition is added to, for example, tobacco and (ii) added to tobacco alone, the product may have a flavor release which is substantially more even over the smoking period than is the case when a single flavoring composition just containing the entrapped and non-confined flavor oil and suspension is employed.

Similarly, it is possible to modify the properties of the orally utilizable material by use of mixtures of spray-dried flavoring compositions characterized by different ratios of entrapment agent to flavor oil. If, for example, a composition containing 10% flavoring agent and 90% gelatin is mixed with one containing 50% flavoring agent and 50% gelatin the resulting blended flavoring composition, after adding non-confined flavor oil and suspension agent, will yield and orally utilizable composition having a more even (relation to duration of smoking activity time) liberation of flavor then is obtained by use of either flavoring agent alone.

Liberation of flavor of the orally utilizable composition of this invention may also be modified in a controlled manner to obtain an even, sustained flavor level from the time that use (e.g., smoking or stirring the tea leaves in boiling water) begins and thereafter for a protracted period of time far in excess of that obtained today in such orally utilizable material by using various mixtures of flavoring compositions (a) having different particle size of physically entrapped flavor, the resulting product deriving much of its initial flavor from the smaller particles and much of its later flavor from the larger particles, or (b) formed from gelatins of different pH (the composition formed from gelatin of higher pH (e.g., 6) giving quick release of flavor, while that formed from lower pH (e.g. 2.5) giving slower release).

A particularly desirable flavor composition of our invention contains unfixed flavor, spray-dried flavor, and suspension, hydroxypropyl cellulose, in proportions of about 1:1:0.1. This product is characterized by an interesting or pleasing flavor level which may start at 0.25 seconds from the point of lighting up the smoking article and last for the entire period of smoking when admixed with the tobacco or a filter tip if such is provided with the smoking article or the wrapper. Over substantially its entire period of flavor release, the flavor level is higher than that of the standard flavored tobacco and the flavor is continuous, rich, full and true.

It is particularly characteristic of the orally utilizable compositions of this invention that they have almost instantaneous to very early flavor perception when used in the mouth. Usually flavor is apparent in not more than 0.25 seconds when orally utilizable compositions are prepared in accordance with this invention. Prior art tobaccos and prior art teas and lemon flavors used in hot prepared beverages have initial flavor perception after 4–5 seconds and frequently after times as long as one minute.

It is also characteristic of our orally utilizable compositions that they retain the flavors under conditions of use, e.g., smoking or in a hot liquid which is consumable, e.g. alcohol or water for extended periods of which may be triple that of compositions heretofore known to those skilled in the art. For example, the flavor perception time may be as long as 20 minutes in contrast to the usual 3–10 minutes which is the flavor perception time of comparable products heretofore known (e.g., U.S. Pat. No. 2,886,440).

The greater availability of flavor for use of the flavoring compositions herein described also permits attainment of high flavor level in the orally utilizable compositions with use of lower amounts of flavoring oils. Orally utilizable compositions prepared with the flavor composition in accordance with this invention have a flavor character more nearly that of the original natural flavor oil than orally utilizable compositions prepared by merely the direct incorporation of the flavoring oil into the orally utilizable material without concomitant use of the physically entrapped flavors and suspension agents.

The term "encapsulate" may be used to describe the relation of the entrapment agent and the flavoring agent and means that the latter, in the form of spray-dried emulsion of discrete micro-droplets, is distributed substantially uniformly within or in the interstices of finally divided particles of the former. The flavoring agent is locked in within the entrapment agent (e.g. gelatin, gum acacia, dextrin and modified food starch) to the extent that the former is released substantially only as the molecules of entrapment agent are dissolved from the surface of the individual entrapment agent particles by the hydrolytic action of the salivary liquids.

The following Examples A–W illustrate processes for preparing the individual flavor components necessary to produce the flavor compositions useful in our invention.

EXAMPLE A

CHERRY FLAVOR FORMULATION
The following mixture is prepared:

| Ingredient | Parts by Weight |
| --- | --- |
| Eugenol | 1.75 |
| Cinnamic Aldehyde | 4.50 |
| Anisyl Acetate | 6.25 |
| Anisic Aldehyde | 9.25 |
| Ethyl Oenanthate | 12.50 |
| Benzyl Acetate | 15.50 |
| Vanillin | 25.00 |
| Ethyl Methyl Phenyl Glycidate | 25.00 |
| Ethyl Butyrate | 37.25 |
| Amyl Butyrate | 50.00 |
| Tolyl Aldehyde | 125.00 |
| Benzaldehyde | 558.00 |

-continued

CHERRY FLAVOR FORMULATION
The following mixture is prepared:

| Ingredient | Parts by Weight |
| --- | --- |
| Alcohol 95% | 130.00 |

EXAMPLE B

LEMON FLAVOR FORMULATION

| Ingredient | Parts by Weight |
| --- | --- |
| Methyl Heptenone | 0.50 |
| Terpineol | 1.00 |
| Linallol | 1.00 |
| n-Decanal | 1.25 |
| n-Octanal | 1.25 |
| Geranyl Acetate | 1.75 |
| Citral | 60.00 |
| Oil of lemon, cold pressed | 100.00 |
| Orange Terpenes | 833.25 |

EXAMPLE C

LIME FLAVOR FORMULATION
The following mixture is prepared:

| Ingredient | Parts by Weight |
| --- | --- |
| Cymene | 1.0 lb. |
| Dipentene | 1.0 lb. |
| Oil of Lime Distilled | 3.0 lb. |
| 6.0 oz. av. citral Terpineol | 2.0 lb. |
| Lemon Terpenes | 10.0 lb. |
| 10 oz. av. Lime Terpenes | 82.0 lb. |

EXAMPLE D

20 Grams of the flavor composition of Example A is emulsified in a solution containing 300 gm gum acacia and 700 gm water. The emulsion is spray-dried with a Bowen Lab Model Drier utilizing 250 c.f.m. of air with an inlet temperature of 500° F., an outlet temperature of 200° F., and a wheel speed of 50,000 r.p.m.

EXAMPLE E

20 Grams of the flavor composition of Example B is emulsified in a solution containing 300 gms gum acacia and 700 gm water. The emulsion is spray-dried with a Bowen Lab Model Drier utilizing 250 c.f.m. of air with an inlet temperature of 500° F., an outlet temperature of 200° F., and a wheel speed of 50,000 r.p.m.

EXAMPLE F

20 Grams of the flavor composition of Example C is emulsified in a solution containing 300 gm gum acacia and 700 gm water. The emulsion is spray-dried with a Bowen Lab Model Drier utilizing 260 c.f.m. of air with an inlet temperature of 500° F., an outlet temperature of 200° F., and a wheel speed of 50,000 r.p.m.

EXAMPLE G

50 Grams of the flavor composition of Example A is emulsified in a solution containing 300 gm gum acacia and 700 gm water. The emulsion is spray-dried with a Bowen Lab Model Drier utilizing 250 c.f.m. of air with an inlet temperature of 500° F., an outlet temperature of 200° F., and a wheel speed of 50,000 r.p.m.

EXAMPLE H

80 Grams of the flavor composition of Example B is emulsified in a solution containing 300 gm gum acacia and 700 gm water. The emulsion is spray-dried with a Bowen Lab Model Drier utilizing 250 c.f.m. of air with an inlet temperature of 500° F., an outlet temperature of 200° F., and a wheel speed of 50,000 r.p.m.

EXAMPLE I

120 Grams of the flavor composition of Example C is emulsified in a solution containing 300 gm gum acacia and 700 gm water. The emulsion is spray-dried with a Bowen Lab Model Drier utilizing 250 c.f.m. of air with an inlet temperature of 500° F., an outlet temperature of 200° F., and a wheel of 50,000 r.p.m.

EXAMPLE J

130 Grams of oil of peppermint redistilled is emulsified in a solution containing 300 gm of "Nadex" dextrin (manufactured by National Starch and Chemical Co. of New York, N.Y.) and 700 gm of water. The emulsion is spray-dried with a Bowen Lab Model Drier utilizing 250 c.f.m. of air with an inlet temperature of 500° F., an outlet temperature of 200° F., and a wheel speed of 50,000 r.p.m.

EXAMPLE K 150 gm of oil of peppermint natural is emulsified in a solution containing 300 gm of "Capsul" modified food starch of National Starch and Chemical Co. of New York, N.Y. and 700 gm of water. The emulsion is spray-dried with a Bowen Lab Model Drier utilizing 250 c.f.m. of air with an inlet temperature of 500° F., an outlet temperature of 200° F., and a wheel speed of 50,000 r.p.m.

EXAMPLE L

10 Parts by weight of 50 Bloom pigskin gelatin is added to 90 parts by weight of water at a temperature of 150° F. The mixture is agitated until the gelatin completely dissolved and the solution is cooled to 120° F. 20 Parts by weight of methyl salicylate (oil of wintergreen) is added to the solution which is then homogenized to form an emulsion having particle size typically in the range of 2–5 microns. This material is kept at 120° F. under which conditions the gelatin will not jell.

Coacervation is induced by adding, slowing and uniformly 40 parts by weight of a 20 percent aqueous solution of sodium sulphate. During coacervation, the gelatin molecules are deposited uniformly about each oil droplet as a nucleus.

Gelatin is effected by pouring the heated coacervate mixture into 1,000 parts by weight of 7 percent aqueous solution of sodium sulphate at 65° F. The resulting jelled coacervate may be filtered and washed with water at temperature below the melting point of gelatin, to remove the salt.

Hardening of the filtered cake, in this example, is effected by washing with 200 parts by weight of 37 percent solution of formaldehyde in water. The cake is then washed to remove residual formaldehyde.

EXAMPLE M

10 Parts by weight of 50 Bloom pigskin gelatin is added to 90 parts by weight of water at a temperature of 150° F. The mixture is agitated until the gelatin completely dissolved and the solution is cooled to 120° F. 20 Parts by weight of the flavor of Example A is added to the solution which is then homogenized to form an emulsion having particle size typically in the range of 2–5 microns. This material is kept at 120° F. under which conditions the gelatin will not jell.

Coacervation is induced by adding, slowly and uniformly 40 parts by weight of a 20 percent aqueous solution of sodium sulphate. During coacervation, the gelatin molecules are deposited uniformly about each oil droplet as a nucleus.

Gelatin is effected by pouring the heated coacervate mixture into 1,000 parts by weight of 7 percent aqueous solution of sodium sulphate at 65° F. The resulting jelled coacervate may be filtered and washead with water at temperatures below the melting point of gelatin, to remove the salt.

Hardening of the filtered cake, in this example, is effected by washing with 200 parts by weight of 37 percent solution of formaldehyde in water. The cake is then washed to remove residual formaldehyde.

EXAMPLE N

10 Parts by weight of 50 Bloom pigskin gelatin is added to 90 parts by weight of water at a temperature of 150° F. The mixture is agitated until the gelatin completely dissolved and the solution is cooled to 120° F. 20 Parts by weight of the flavor of Example B is added to the solution which is then homogenized to form an emulsion, having particle size typically in the range of 2–5 microns. This material is kept at 120° F. under which conditions the gelatin will not jell.

Coacervation is induced by adding, slowly and uniformly 40 parts by weight of a 20 percent aqueous solution of sodium sulphate. During coacervation, the gelatin molecules are deposited uniformly about each oil droplet as a nucleus.

Gelatin is effected by pouring the heated coacervate mixture into 1,000 parts by weight of 7 percent aqueous solution of sodium sulphate at 65° F. The resulting jelled coacervate may be filtered and washed with water at temperatures below the melting point of gelatin, to remove the salt.

Hardening of the filtered cake, in this example, is effected by washing with 200 parts by weight of 37 percent solution of formaldehyde in water. The cake is then washed to remove residual formaldehyde.

EXAMPLE O

10 Parts by weight of 50 Bloom pigskin gelatin is added to 90 parts by weight of water at a temperature of 150° F. The mixture is agitated until the gelatin completely dissolved and the solution is cooled to 120° F. 20 Parts by weight of the flavor of Example C is added to the solution which is then homogenized to form an emulsion, having particle size typically in the range of 2–5 microns. This material is kept at 120° F. under which conditions the gelatin will not jell.

Coacervation is induced by adding, slowly and uniformly 40 parts by weight of a 20 percent aqueous solution of sodium sulphate. During coacervation, the gelatin molecules are deposited uniformly about each oil droplet as a nucleus.

Gelatin is effected by pouring the heated coacervate mixture into 1,000 parts by weight of 7 percent aqueous solution of sodium sulphate at 65° F. The resulting jelled coacervate may be filtered and washed with water at temperatures below the melting point of gelatin, to remove the salt.

Hardening of the filtered cake, in this example, is effected by washing with 200 parts by weight of 37 percent solution of formaldehyde in water. The cake is then washed to remove residual formaldehyde.

EXAMPLE P

A 40 percent dextrin solution is freeze-dried. This is accomplished by a conventional technique such as that described in column 4 of U.S. Pat. No. 3,404,007. The freeze-dried material is then milled to a particle size of 20-40 mesh.

100 Grams of this freeze-dried material are then combined with 50 grams of orange oil. This is accomplished by mixing the materials in a suitable blender, such as a ribbon blender. This results in a dry, free-flowing powder having the advantages heretofore described. To ensure against atmospheric reaction or vaporization of the orange oil in the solid matrix, the powder is given a protective coating to seal the entrances to the interstices or cavities in the porous particulate matrix. One suitable form of coating is a dextrin solution which has the property of forming an impermeable film for preventing the escape of permeation of the flavoring oil.

EXAMPLE Q

A 40 percent dextrin solution is freeze-dried. This is accomplished by a conventional technique such as that described in column 4 of U.S. Pat. No. 3,404,007. The freeze-dried material is then milled to a particle size of 20-40 mesh.

100 Grams of this freeze-dried material are then combined with 50 grams of the flavor of Example A. This is accomplished by mixing the materials in a suitable blender, such as a ribbon blender. This results in a dry, free-flowing powder having the advantages heretofore described. To ensure against atmospheric reaction of vaporization of the flavor of Example A in the solid matrix, the powder is given a protective coating to seal the entrances to the interstices or cavities in the porous particulate matrix. One suitable form of coating is a dextrin solution which has the property of forming an impermeable film for preventing the escape of permeation of the flavoring oil.

EXAMPLE R

A 40 percent dextrin solution is freeze-dried. This is accomplished by a conventional technique such as that described in column 4 of U.S. Pat. No. 3,404,007. The freeze-dried material is then milled to a particle size of 20-40 mesh.

100 Grams of this freeze-dried material are then combined with 50 grams of the flavor of Example B. This is accomplished by mixing the materials in a suitable blender, such as a ribbon blender. This results in a dry, free-flowing powder having the advantages heretofore described. To ensure against atmospheric reaction of vaporization of the flavor of Example B in the solid matrix, the powder is given a protective coating to seal the entrances to the interstices or cavities in the porous particulate matrix. One suitable form of coating is a dextrin solution which has the property of forming an impermeable film for preventing the escape of permeation of the flavoring oil.

EXAMPLE S

A 40 percent dextrin solution if freeze-dried. This is accomplished by a conventional technique such as that described in column 4 of U.S. Pat. No. 3,404,007. The freeze-dried material is then milled to a particle size of 20-40 mesh.

100 Grams of this freeze-dried material are then combined with 50 grams of the flavor of Example C. This is accomplished by mixing the materials in a suitable blender, such as a ribbon blender. This results in a dry, free-flowing powder having the advantages heretofore described. To ensure against atmospheric reaction or vaporization of the flavor of Example C in the solid matrix, the powder is given a protective coating to seal the entrances of the interstices or cavities in the porous particulate matrix. One suitable form of coating is a dextrin solution which has the property of forming an impermeable film for preventing the escape of permeation of the flavoring oil.

EXAMPLE T

2-Hydroxyethyl methacrylate (100 parts) is stirred with 0.05 part t-butyl peroctoate in a nitrogen atmosphere at a temperature of 40° C. for 30 minutes. The resultant mixture is cooled to 25° C. and further 0.10 part t-butyl peroctoate is added, ethylene glycol dimethacrylate (0.1 part) being added at the same time. To this casting solution oil of peppermint, added in an amount of 10 parts. After curing and granulation, the flavored powder is used as part of a flavor releasing formulation in smoking tobaccos or "hot" beverage powders as exemplified infra.

EXAMPLE U

Distilled 2-hydroxyethyl methacrylate (100 gm) is stirred with 0.05 gm tertiary butyl peroctoate in an anaerobic atmosphere at 25°-70° C. for 14-40 minutes. The resultant mixture is cooled to 25° C. and a further 0.10 gm of tertiary butyl peroctoate is added together with 0.15 gm of ethylene glycol dimethacrylate. Oil of peppermint syrup to yield a flavored prepolylmer syrup which is suitable for storing. After curing and granulation, the flavor-carrying granules are added as a flavoring releasing component to smoking tobacco or "hot" beverage powders as set forth infra.

EXAMPLE VA

A. Preparation of Lemon Oil Capsules Preparation of the Sheel Composition and Solution Five hundred grams of water are heated to boil and 500 grams dextrin (National Starch and Chemical Corporation, 78-1523) is added with rapid and efficient mixing, using a closed turbine, high shear mixer (Barrington CONVERTI JET Model CJ-5B). Mixing is continued until a homogeneous solution is obtained.

B. Preparation of Lemon Oil Capsule Composition

81 Grams of lemon oil (California cold pressed oil) is emulsified in 300 grams of the shell composition solution (A) by means of a homogenizing mixer (Barrington CONVERTI JET Model CJ-5B operated as a closed turbine unit). At the start of the operation the temperature of the matrix composition solution is 20° C. and of the lemon oil 15° C. The mixing vessel is cooled during the operation of the mixture in order to prevent a rise in the temperature and to keep the temperature below 25° C.

C. Capsule Formation and Dehydration

One thousand grams of polyethylene glycol having an average molecular weight of 400 (Union Carbide Corporation, Carbowax 400) and at a temperature of about 25° C. is placed in a vessel equipped with a homogenizing mixer (Barrington CONVERTI JET Model CJ-5B operated as an open turbine unit). One hundred grams of the lemon oil capsule composition (B) is introduced into the polyethylene glycol in a thin stream with steady medium speed operation of the mixer (about 1,500 rpm shaft speed). By the action of the mixer, the lemon oil emulsion is broken up into coarse liquid particles, which in contact with the polyethylene glycol, are rapidly converted into gel particles and finally into virtually anhydrous capsule granules.

The capsule granules are separated from the excess polyethylene glycol by means of a basket centrifuge and added to smoking tobacco or "hot" beverage powders as set forth infra.

EXAMPLE XA

COFFEE FLAVOR FORMULATION
The following basic coffee formulation is prepared:

| Ingredients | Parts by Weight |
|---|---|
| Diacetyl (10% in 95% food grade aqueous ethanol) | 1 |
| Benzaldehyde | 1 |
| Furfural | 0.5 |
| Furfural Propionate | 10 |
| Trimethyl Pyrazine (10% in 95% aqueous food grade ethanol) | 1 |
| 2,6-Dimethoxy phenol | 2 |
| Pyruvic acid | 15 |
| Furfural Mercaptan (1% solution in 95% food grade ethanol) | 1.0 |
| Furfural acetate | 0.5 |
| Propylene glycol | 68 |
| 5-Acetyl-2-(furfurylthio)-dihydro-2,5-dimethyl-3-[2H]-furanone. | 20 |

The following examples are given to illustrate embodiments of the invention as it is presently preferred to practice it. It will be understood that these examples are illustrative and the invention is not to be considered as restricted thereto except as indicated in the appended claims.

EXAMPLE I

The following mixture is prepared:

| Ingredient | Parts by Weight |
|---|---|
| Liquid Flavor Composition of Example A | 48.4 |
| Cab-O-Sil ® M-5 (Brand of Silica produced by the Cabot Corporation of 125 High Street, Boston, Mass. 02110; Physical Properties: Area:200 m$^2$/gm Nominal Particle Size: 0.012 microns Density: 2.3 lbs/cu.ft.) | 3.2 |

The Cab-O-Sil ® is dispersed in the liquid flavor composition of Example A with vigorous stirring, thereby resulting in a viscous liquid. 48.4 Parts by weight of the powder flavor composition of Example D is then blended into the said viscous liquid, with stirring at 25° C. for a period of 30 minutes, resulting in a thixotropic sustained release flavor paste.

EXAMPLE II

The following mixture is prepared:

| Ingredient | Parts by Weight |
|---|---|
| Liquid flavor composition of Example A | 26 |
| Cab-O-Sil ® M-5 Brand of Silica produced by the Cabot Corporation of 125 High St., Boston, Mass. 02110; Physical Properties: Surface Area: 200 m$^2$/gm Nominal particle size: 0.012 microns Density: 2.3 lbs/cu.ft.) | 9 |

The Cao-O-Sil ® is dispersed in the liquid flavor composition of Example A with vigorous stirring, thereby resulting in a viscous liquid. 65 Parts by weight of the powder flavor compositions of Example D is then blended into the said viscous liquid, with stirring at 25° C. for a period of 30 minutes resulting in a dry, free flowing sustained release flavor powder.

EXAMPLE III

The following mixture is prepared:

| Ingredient | Parts by Weight |
|---|---|
| Peppermint oil | 47.25 |
| Propylene glycol | 0.50 |
| Cab-O-Sil ® M-5 (Brand of Silica produced by the Cabot Corporation of 125 High St., Boston, Mass. 02110; Physical Properties: Surface Area: 200 m$^2$/gm Nominal particle size: 0.012 microns Density: 2.3 lbs/cu.ft. | 5.00 |

The Cab-O-Sil ® is dispersed in the peppermint oil with vigorous stirring, thereby resulting in a viscous liquid. 47.25 Parts by weight of the powder flavor composition of Example J is then blended into the said viscous liquid, with stirring at 25° C. for a period of 30 minutes resulting in a thixotropic sustained release flavor paste.

EXAMPLE IV

The following mixture is prepared:

| Ingredient | Parts by Weight |
|---|---|
| Peppermint oil | 20 |
| Propylene glycol | 9 |
| Cab-O-Sil ® M-5 (Brand of Silica produced by the Cabot Corporation of 125 High St. Boston, Mass. 02110; Physical Properties: Surface Area: 200 m$^2$/gm Nominal particle size: 0.012 microns Density: 2.1 lbs/cu.ft.) | 5 |

The Cab-O-Sil ® is dispersed in the peppermint oil with vigorous stirring, thereby resulting in a viscous liquid. 71 Parts by weight of the powder flavor composition of Example K is then blended into the said viscous liquid, with stirring at 25° C. for a period of 30 minutes resulting in a dry, free flowing sustained release flavor powder.

EXAMPLE V

The following mixture is prepared:

| Ingredient | Parts by Weight |
|---|---|
| Liquid flavor composition of Example B | 20 |
| Propyl glycol | 9 |
| Cab-O-Sil ® M-5 (Brand of Silica produced by the Cabot Corporation of 125 High St., Boston Mass. 02110; Physical Properties: Surface Area: 200 m$^2$/gm Nominal Particle Size: 0.012 microns Density: 2.3 lbs/cu.ft.) | 5 |

The Cab-O-Sil ® is dispersed in the liquid flavor composition of Example B with vigorous stirring, thereby resulting in a viscous liquid. 65 Parts by weight of the powder flavor composition of Example E is then blended into the said viscous liquid, with stirring at 25° C. for a period of 30 minutes resulting in a dry, free flowing sustained release flavor powder.

EXAMPLE VI

The following mixture is prepared:

| Ingredient | Parts by Weight |
|---|---|
| Liquid Flavor composition of Example C | 48.4 |
| Ethyl Cellulose | 3.2 |

The ethyl cellulose is dispersed in the liquid flavor composition of Example C with vigorous stirring, thereby resulting in a viscous liquid. 48.4 Parts by weight of the powder flavor composition of Example F is then blended into the said viscous liquid, with stirring at 25° C. for a period of 30 minutes resulting in a thixotropic sustained release flavor paste.

EXAMPLE VII

The following mixture is prepared:

| Ingredient | Parts by Weight |
|---|---|
| Oil of wintergreen | 47.25 |
| Propylene glycol | 0.50 |
| Cab-O-Sil ® M-5 (Brand of Silica produced by the Cabot Corporation of 125 High St., Boston, Mass. 02110; Physical Properties: Surface Area: 200 m$^2$gm Nominal particle size: 0.012 microns Density: 2.3 lbs/cu.ft.) | 5.00 |

The Cab-O-Sil ® is dispersed in the oil of wintergreen with vigorous stirring, thereby resulting in a viscous liquid. 47.25 Parts by weight of the powder flavor composition of Example L is then blended into the said viscous liquid, with stirring at 25° C. for a period of 30 minutes resulting in a thixotropic sustained release flavor paste.

EXAMPLE VIII

The following mixture is prepared:

| Ingredient | Parts by Weight |
|---|---|
| Liquid flavor composition of Example A | 26 |
| Propylene glycol | 1 |
| Cab-O-Sil ® M-5 (Brand of Silica produced by the Cabot Corporation of 125 High St., Boston Mass. 02110; Physical Properties: Surface Area: 200 m$^2$/gm Nominal particle size: 0.012 microns Density: 2.3 lbs/cu.ft.) | 9 |

The Cab-O-Sil ® is dispersed in the liquid flavor composition of Example A with vigorous stirring, thereby resulting in a viscous liquid. 65 Parts by weight of the powdered flavor composition of Example M is then blended into the said viscous liquid, with stirring at 25° C. for a period of 30 minutes resulting in a dry, free flowing sustained release flavor powder.

EXAMPLE IX

The following mixture is prepared:

| Ingredient | Parts by Weight |
|---|---|
| Liquid flavor composition of Example B | 48.4 |
| Propylene glycol | 2 |
| Cab-O-Sil ® M-5 (Brand of Silica produced by the Cabot Corporation of 125 High St., Boston, Mass. 02110; Physical Properties: Surface Area: 200 m$^2$/gm Nominal particel size: 0.012 microns Density: 2.3 lbs/cu.ft. | 3.4 |

The Cab-O-Sil ® is dispersed in the liquid flavor composition of Example B with vigorous stirring, thereby resulting in a viscous liquid. 48.4 Parts by weight of the powder flavor composition of Example N is then blended into the said viscous liquid, with stirring at 25° C. for a period of 30 minutes resulting in a thixotropic sustained release flavor paste.

EXAMPLE X

The following mixture is prepared:

| Ingredient | Parts by Weight |
|---|---|
| Liquid flavor composition of Example C | 48.4 |
| Propylene Glycol | 5 |
| Ethyl Cellulose | 4.1 |

The ethyl cellulose is dispersed in the liquid flavor composition of Example C with vigorous stirring, thereby resulting in a viscous liquid. 48.4 Parts by weight of the powder flavor composition of Example O is then blended in the said viscous liquid, with stirring at 25° C. for a period of 30 minutes resulting in thixotropic sustained release flavor paste.

EXAMPLE XI

The following mixture is prepared:

| Ingredient | Parts by Weight |
|---|---|
| Orange oil | 48.4 |
| Cab-O-Sil ® M-5 | 3.2 |
| (Brand of Silica produced by the Cabot Corporation of 125 High St., Boston, Mass. 02110; Physical Properties: | |
| Surface Area: 200 m²/gm | |
| Nominal Particle Size: 0.012 microns | |
| Density: 2.3 lbs/cu.ft.) | |

The Cab-O-Sil ® is dispersed in the orange oil with vigorous stirring, thereby resulting in a viscous liquid. 48.4 Parts by weight of the powder flavor composition of Example P is then lended into the said viscous liquid, with stirring at 25° C. for a period of 30 minutes resulting in a thixotropic sustained release flavor paste.

EXAMPLE XII

The following mixture is prepared:

| Ingredient | Parts by Weight |
|---|---|
| Liquid flavor compostion of Example A | 20 |
| Propylene glycol | 2 |
| Cab-O-Sil ® M-5 | 4.2 |
| (Brand of Silica produced by the Cabot Corporation of 125 High Street, Boston, Mass. 02110; Physical Properties: | |
| Surface Area: 200 m²/gm | |
| Nominal Particle Size: 0.012 microns | |
| Density: 2.3 lbs/cu.ft.) | |
| Ethyl Cellulose | 1.0 |

The Cab-O-Sil ® and ethyl cellulose is dispersed in the liquid flavor composition of Example A with vigorous stirring, thereby resulting in a viscous liquid. 70 Parts by weight of the powder flavor composition of Example Q is then blended into the said viscous liquid, with stirring at 25° C. for a period of 30 minutes resulting in a dry, free flowing sustained release flavor powder.

EXAMPLE XIII

The following mixture is prepared:

| Ingredient | Parts by Weight |
|---|---|
| Liquid flavor composition of Example A | 20 |
| Propylene glycol | 1 |
| Cab-O-Sil ® M-5 | 3 |
| (Brand of Silica produced by the Cabot Corporation of 125 High St., Boston, Mass. 02110; Physical Properties: | |
| Surface Area: 200 m²/gm | |
| Nominal Particle Size: 0.012 microns | |
| Density: 2.3 lbs/cu.ft.) | |
| Ethyl Cellulose | 3 |

The Cab-O-Sil ® and ethyl cellulose are dispersed in the liquid flavor composition of Example A with vigorous stirring, thereby resulting in a viscous liquid. 65 Parts by weight of the powder flavor composition of Example Q is then blended into the said viscous liquid, with stirring at 25° C. for a period of 30 minutes resulting in a dry, free flowing sustained release flavor powder.

EXAMPLE XIV

The following mixture is prepared:

| Ingredient | Parts by Weight |
|---|---|
| Liquid flavor composition of Example B | 48.4 |
| Propylene glycol | 2 |
| Cab-O-Sil ® M-5 | 3.2 |
| (Brand of Silica produced by the Cabot Corporation of 125 High Street, Boston, Mass. 02110; Physical Properties: | |
| Surface Area: 200 m²/gm | |
| Nominal Particle Size: 0.012 microns | |
| Density: 2.3 lbs/cu.ft.) | |
| Ethyl cellulose | 1.5 |

The Cab-O-Sil ® and ethyl cellulose is dispersed in the liquid flavor composition of Example B with vigorous stirring, thereby resulting in a viscous liquid. 48.4 Parts by weight of the powder flavor composition of Example R is then blended into the said viscous liquid, with stirring at 25° C. for a period of 30 minutes resulting in a thixotropic sustained release flavor paste.

EXAMPLE XV

The following mixture is prepared:

| Ingredient | Parts by Weight |
|---|---|
| Liquid flavor composition of Example C | 18 |
| Propylene glycol | 1 |
| Cab-O-Sil ® M-5 | 3 |
| (Brand of Silica produced by the Cabot Corporation of 125 High Street, Boston, Mass. 02110; Physical Properties: | |
| Surface Area: 200 m²/gm | |
| Nominal Particle Size: 0.012 microns | |
| Density: 2.3 lbs/cu.ft.) | |
| Ethyl cellulose | 1 |

The Cab-O-Sil ® and ethyl cellulose is dispersed in the liquid flavor composition of Example C with vigorous stirring, thereby resulting in a viscous liquid. 62 Parts by weight of the powder flavor composition of Example S is then blended into the said viscous liquid, with stirring at 25° C. for a period of 30 minutes resulting in a dry, free flowing sustained release flavor powder.

EXAMPLE XVI

The following mixture is prepared:

| Ingredient | Parts by Weight |
|---|---|
| Peppermint oil | 48.4 |
| Propylene glycol | 2 |
| Cab-O-Sil ® M-5 | 3.8 |
| (Brand of Silica produced by the Cabot Corporation of 125 High Street, Boston, Mass. 02110; Physical Properties: | |
| Surface Area: 200 m²/gm | |
| Nominal Particle Size: 0.012 microns | |

| Ingredient | Parts by Weight |
|---|---|
| Density: 2.3 lbs/cu.ft.) | |

The Cab-O-Sil® is dispersed in the peppermint oil with vigorous stirring, thereby resulting in a viscous liquid. 48.4 Parts by weight of the powder flavor composition in Example T is then blended into the said viscous liquid, with stirring at 25° C. for a period of 30 minutes resulting in a thixotropic sustained release flavor paste.

EXAMPLE XVII

The following mixture is prepared:

| Ingredient | Parts by Weight |
|---|---|
| Peppermint oil | 21 |
| Propylene glycol | 1.0 |
| Cab-O-Sil® M-5 | 2.0 |
| (Brand of Silica produced by the Cabot Corporation of 125 High Street, Boston, Mass. 02110; Physical Properties: | |
| Surface Area: 200 m²/gm | |
| Nominal Particle Size: 0.012 microns | |
| Density: 2.3 lbs./cu.ft.) | |
| Ethyl cellulose | 3.2 |

The Cab-O-Sil® and ethyl cellulose is dispersed in the peppermint oil with vigorous stirring, thereby resulting in a viscous liquid. 65 Parts by weight of the powder flavor composition of Example U is then blended into the said viscous liquid, with stirring at 25° C. for a period of 30 minutes in a dry, free flowing sustained release flavor powder.

EXAMPLE XVIII

The following mixture is prepared:

| Ingredient | Parts by Weight |
|---|---|
| Liquid flavor composition of Example B | 52 |
| Propylene glycol | 1 |
| Cab-O-Sil® M-5 | 3.8 |
| (Brand of Silica produced by the Cabot Corporation of 125 High St., Boston, Mass. 02110; Physical Properties: | |
| Surface Area: 200 m²/gm | |
| Nominal Particle Size: 0.012 microns | |
| Density: 2.3 lbs./cu.ft.) | |
| Ethyl cellulose | 2.2 |

The Cab-O-Sil® and ethyl cellulose is dispersed in the liquid flavor composition of Example B with vigorous stirring, thereby resulting in a viscous liquid. 44 Parts by weight of the powder flavor composition of Example V is then blended into the said viscous liquid, with stirring at 25° C. for a period of 30 minutes resulting in a thixotropic sustained release flavor paste.

EXAMPLE XIX

The following mixture is prepared:

| Ingredient | Parts by Weight |
|---|---|
| Liquid flavor composition of Example A | 48.4 |
| Propylene glycol | 3 |
| Cab-O-Sil® M-5 | 5.2 |
| (Brand of Silica produced by the Cabot Corporation of 125 High St., Boston, Mass. 02110; Physical Properties: | |
| Surface Area: 200 m²/gm | |
| Nominal Particle Size: 0.012 microns | |
| Density: 2.3 lbs./cu.ft.) | |

The Cab-O-Sil® is dispersed in the liquid flavor composition of Example A with vigorous stirring, thereby resulting in a viscous liquid. 48.4 Parts by weight of the powder flavor composition of Example G is then blended into the siad viscous liquid, with stirring at 25° C. for a period of 50 minutes resulting in a thixotropic sustained release flavor paste.

EXAMPLE XX

The following mixture is prepared:

| Ingredient | Parts by Weight |
|---|---|
| Liquid flavor composition of Example B | 25 |
| Propylene glycol | 2 |
| Cab-O-Sil® M-5 | 10 |
| (Brand of Silica produced by the Cabot Corporation of 125 High St., Boston, Mass. 02110; Physical Properties: | |
| Surface Area: 200 m²/gm | |
| Nominal Particle Size: 0.012 microns | |
| Density: 2.3 lbs./cu.ft.) | |
| Ethyl cellulose | 4 |

The Cab-O-Sil® and ethyl cellulose is dispersed in the liquid flavor composition of Example B with vigorous stirring, thereby resulting in a viscous liquid. 65 Parts by weight of the powder flavor composition of Example H is then blended into the said viscous liquid, with stirring at 40° C. for a period of 100 minutes resulting in a dry, free flowing sustained release flavor powder.

EXAMPLE XXI

The following mixture is prepared:

| Ingredient | Parts by Weight |
|---|---|
| Liquid flavor composition of Example C | 25 |
| Propylene glycol | 1 |
| Cab-O-Sil® M-5 | 3 |
| (Brand of Silica produced by the Cabot Corporation of 125 High St., Boston, Mass. 02110; Physical Properties: | |
| Surface Area: 200 m²/gm | |
| Nominal Particle Size: 0.012 microns | |
| Density: 2.3 lbs./cu.ft.) | |
| Ethyl cellulose | 8 |

The Cab-O-Sil® and ethyl cellulose is dispersed in the liquid flavor composition of Example C with vigorous stirring, thereby resulting in a viscous liquid. 65 Parts by weight of the powder flavor composition of Example I is then blended into said viscous liquid, with stirring at 25° C. for a period of 30 minutes resulting in a dry, free flowing sustained release flavor powder.

EXAMPLE XXII

The following mixture is prepared:

| Ingredient | Parts by Weight |
|---|---|
| Liquid Flavor Composition of Example A | 48.4 |
| KLUCEL ® HF (Brand of hydroxypropyl cellulose manufactured by Hercules Corporation of Wilmington, Delaware having a molecular weight of 800,000 and viscosity properties as defined according to FIG. 2 (see note 1) | 3.2 |

NOTE 1
KLUCEL ® is a brand of hydroxypropyl cellulose manufactured by the Hercules Corporation of Wilmington, Delaware having the structure:

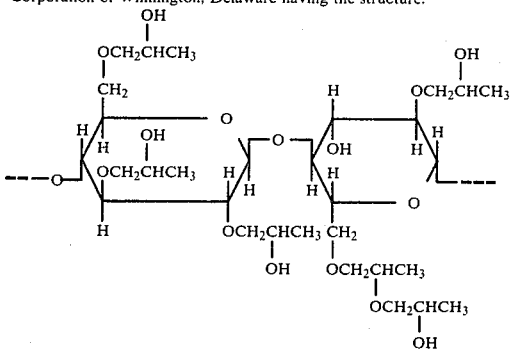

having a particle size such that 95% of the particles are passed through 30 mesh screens and 99% of the material is passed through 20 mesh screens.

The KLUCEL ® HF is dispersed in the liquid flavor composition of Example A with vigorous stirring thereby resulting in a viscous liquid. 48.4 Parts by weight of the powder flavor composition of Example D is then blended into said viscous liquid with stirring at 25° C. for a period of 30 minutes resulting in a thixotropic sustained release flavor paste.

EXAMPLE XXIII

The following mixture is prepared:

| Ingredient | Parts by Weight |
|---|---|
| Liquid Flavor Composition of Example A | 48.4 |
| KLUCEL ® EF (brand of foodgrade hydroxypropyl cellulose manufactured by Hercules Corporation of Wilmington, Delaware having a molecular weight of 50,000 and viscosity properties defined according to FIG. 2) | 3.2 |

The KLUCEL ® EF is dispersed in the liquid flavor composition of Example A with vigorous stirring, thereby resulting in a viscous liquid. 48.4 Parts by weight of the powder flavor composition of Example D is then blended into the said viscous liquid, with stirring at 25° C. for a period of 30 minutes, resulting in a thixotropic sustained release flavor paste.

EXAMPLE XXIV

The following mixture is prepared:

| Ingredient | Parts by Weight |
|---|---|
| Liquid Flavor composition of Example A | 48.4 |
| KLUCEL ® LF (brand of hydroxypropyl cellulose manufactured by Hercules Corporation of Wilmington, Delaware having a molecular weight of 100,000 and viscosity properties defined according to FIG. 2) | 3.2 |

The KLUCEL ®LF is dispersed in the liquid flavor composition of Example A with vigorous stirring, thereby resulting in a viscous liquid. 48.4 Parts by weight of the powder flavor composition of Example D is then blended into the said viscous liquid, with stirring at 25° C. for a period of 30 minutes, resulting in a thixotropic sustained release flavor paste.

EXAMPLE XXV

The following mixture is prepared:

| Ingredient | Parts by Weight |
|---|---|
| Liquid Flavor Composition of Example A | 48.4 |
| KLUCEL ® JF (brand of foodgrade hydroxypropyl cellulose manufactured by Hercules Corporation of Wilmington, Delaware having a molecular weight of 120,000 and viscosity properties defined according to FIG. 2) | 3.2 |

The KLUCEL ®JF is dispersed in the liquid flavor composition of Example A with vigorous stirring, thereby resulting in a viscous liquid. 48.4 Parts by weight of the powder flavor composition of Example D is then blended into the said viscous liquid, with stirring at 25° C. for a period of 30 minutes, resulting in a thixotropic sustained release flavor paste.

EXAMPLE XXVI

The following mixture is prepared:

| Ingredient | Parts by Weight |
|---|---|
| Liquid Flavor Composition of Example A | 48.4 |
| KLUCEL ® GF (brand of foodgrade hydroxypropyl cellulose manufactured by Hercules Corporation of Wilmington, Delaware having a molecular weight of 300,000 and viscosity properties defined according to FIG. 2) | 3.2 |

The KLUCEL ®GF is dispersed in the liquid flavor composition of Example A with vigorous stirring, thereby resulting in a viscous liquid. 48.4 Parts by weight of the powder flavor composition of Example D is then blended into the said viscous liquid, with stirring at 25° C. for a period of 30 minutes, resulting in a thixotropic sustained release flavor paste.

EXAMPLE XXVII

The following mixture is prepared:

| Ingredient | Parts by Weight |
|---|---|
| Liquid Flavor Composition of Example A | 48.4 |
| KLUCEL ® MF (brand of foodgrade | 3.2 |

| Ingredient | Parts by Weight |
| --- | --- |
| hydroxypropyl cellulose manufactured by Hercules Corporation of Wilmington, Delaware having a molecular weight of 700,000 and viscosity properties defined according to FIG. 2) | |

EXAMPLE XXVIII

The following mixture is prepared:

| Ingredient | Parts by Weight |
| --- | --- |
| Liquid Flavor Composition of Example A | 48.4 |
| KLUCEL® HF (brand of foodgrade hydroxypropyl cellulose manufactured by Hercules Corporation of Wilmington, Delaware having a molecular Weight of 800,000 and viscosity properties defined according to FIG. 2) | 3.2 |

The KLUCEL®HF is dispersed in the liquid flavor composition of Example A with vigorous stirring, thereby resulting in a viscous liquid. 48.4 Parts by weight of the powder flavor composition of Example D is then blended into the said viscous liquid, with stirring at 25° C. for a period of 30 minutes, resulting in a thixotropic sustained release flavor paste.

EXAMPLE XXIX

The following mixture is prepared:

| Ingredient | Parts by Weight |
| --- | --- |
| Liquid Flavor Composition of Example B | 48.4 |
| KLUCEL® EF (brand of foodgrade hydroxypropyl cellulose manufactured by Hercules Corporation of Wilmington, Delaware having a molecular weight of 50,000 and viscosity properties defined according to FIG. 2) | 3.2 |

The KLUCEL®EF is dispersed in the liquid flavor composition of Example A with vigorous stirring, thereby resulting in a viscous liquid. 48.4 Parts by weight of the powder flavor composition of Example D is then blended into the said viscous liquid, with stirring at 25° C. for a period of 30 minutes, resulting in a thixotropic sustained release flavor paste.

EXAMPLE XXX

The following mixture is prepared:

| Ingredient | Parts by Weight |
| --- | --- |
| Liquid Flavor Composition of Example B | 48.4 |
| KLUCEL® LF (brand of foodstuff hydroxypropyl cellulose manufactured by Hercules Corporation of Wilmington, Delaware having a molecular weight of 100,000 and viscosity properties defined according to FIG. 2) | 3.2 |

The KLUCEL®LF is dispersed in the liquid flavor composition of Example A with vigorous stirring, thereby resulting in a viscous liquid. 48.4 Parts by weight of the powder flavor composition of Example D is then blended into the said viscous liquid, with stirring at 25° C. for a period of 30 minutes, resulting in a thixotropic sustained release flavor paste.

EXAMPLE XXXI

The following mixture is prepared:

| Ingredient | Parts by Weight |
| --- | --- |
| Liquid Flavor Composition of Example B | 48.4 |
| KLUCEL® JF (brand of foodgrade hydroxypropyl cellulose manufactured by Hercules Corporation of Wilmington, Delaware having a molecular weight of 120,000 and viscosity properties defined according to FIG. 2) | 3.2 |

The KLUCEL®JF is dispersed in the liquid flavor composition of Example A with vigorous stirring, thereby resulting in a viscous liquid. 48.4 Parts by weight of the powder flavor composition of Example D is then blended into the said viscous liquid, with stirring at 25° C. for a period of 30 minutes, resulting in a thixotropic sustained release flavor paste.

EXAMPLE XXXII

The following mixture is prepared:

| Ingredient | Parts by Weight |
| --- | --- |
| Liquid Flavor Composition of Example B | 48.4 |
| KLUCEL® GF (brand of foodgrade of hydroxypropyl cellulose manufactured by Hercules Corporation of Wilmington, Delaware having a molecular weight of 300,000 and viscosity properties defined according to FIG. 2) | 3.2 |

The KLUCEL®GF is dispersed in the liquid flavor composition of Example A with vigorous stirring, thereby resulting in a viscous liquid. 48.4 Parts by weight of the powder flavor composition of Example D is then blended into the said viscous liquid, with stirring at 25° C. for a period of 30 minutes, resulting in a thixotropic sustained release flavor paste.

EXAMPLE XXXIII

The following mixture is prepared:

| Ingredient | Parts by Weight |
| --- | --- |
| Liquid Flavor Composition of Example B | 48.4 |
| KLUCEL® MF (brand of foodgrade hydroxypropyl cellulose manufactured by Hercules Corporation of Wilmington, Delaware having a molecular weight of 700,000 and viscosity properties defined according to FIG. 2) | 3.2 |

The KLUCEL®MF is dispersed in the liquid flavor composition of Example A with vigorous stirring, thereby resulting in a viscous liquid. 48.4 Parts by weight of the powder flavor composition of Example D is then blended into the said viscous liquid, with stirring at 25° C. for a period of 30 minutes, resulting in a thixotropic sustained release flavor paste.

EXAMPLE XXXIV

The following mixture is prepared:

| Ingredient | Parts by Weight |
|---|---|
| Liquid Flavor Composition of Example B | 48.4 |
| KLUCEL ® HF (brand of foodgrade hydroxypropyl cellulose manufactured by Hercules Corporation of Wilmington, Delaware having a molecular weight of 800,000 and viscosity properties defined according to FIG. 2) | 3.2 |

The KLUCEL ®HF is dispersed in the liquid flavor composition of Example A with vigorous stirring, thereby resulting in a viscous liquid. 48.4 Parts by weight of the powder flavor composition of Example D is then blended into the said viscous liquid, with stirring at 25° C. for a period of 30 minutes, resulting in a thixotropic sustained release flavor paste.

EXAMPLE XXXV

The following mixture is prepared:

| Ingredient | Parts by Weight |
|---|---|
| Liquid Flavor Composition of Example C | 48.4 |
| KLUCEL ® EF (brand of foodgrade hydroxypropyl cellulose manufactured by Hercules Corporation of Wilmington, Delaware having a molecular weight of 500,000 and viscosity properties defined according to FIG. 2) | 3.2 |

The KLUCEL ®EF is dispersed in the liquid flavor composition of Example A with vigorous stirring, thereby resulting in a viscous liquid. 48.4 Parts by weight of the powder flavor composition of Example D is then blended into the said viscous liquid, with stirring at 25° C. for a period of 30 minutes, resulting in a thixotropic sustained release flavor paste.

EXAMPLE XXXVI

The following mixture is prepared:

| Ingredient | Parts by Weight |
|---|---|
| Liquid Flavor Composition of Example C | 48.4 |
| KLUCEL ® LF (brand of foodgrade hydroxypropyl cellulose manufactured by Hercules Corporation of Wilmington, Delaware having a molecular weight of 100,000 and viscosity properties defined according to FIG. 2) | 3.2 |

The KLUCEL ®LF is dispersed in the liquid flavor composition of Example A with vigorous stirring, thereby resulting in a viscous liquid. 48.4 Parts by weight of the powder flavor composition of Example D is then blended into the said viscous liquid, with stirring at 25° C. for a period of 30 minutes, resulting in a thixotropic sustained release flavor paste.

EXAMPLE XXXVII

The following mixture is prepared:

| Ingredient | Parts by Weight |
|---|---|
| Liquid Flavor Composition of Example C | 48.4 |
| KLUCEL ® JF (brand of foodgrade hydroxypropyl cellulose manufactured by Hercules Corporation of Wilmington, Delaware having a molecular weight of 120,000 and viscosity properties defined according to FIG. 2) | 3.2 |

The KLUCEL ®JF is dispersed in the liquid flavor composition of Example A with vigorous stirring, thereby resulting in a viscous liquid. 48.4 Parts by weight of the powder flavor composition of Example D is then blended into the said viscous liquid, with stirring at 25° C. for a period of 30 minutes, resulting in a thixotropic sustained release flavor paste.

EXAMPLE XXXVIII

The following mixture is prepared:

| Ingredient | Parts by Weight |
|---|---|
| Liquid Flavor Composition of Example C | 48.4 |
| KLUCEL ® GF (brand of foodgrade hydroxypropyl cellulose manufactured by Hercules Corporation of Wilmington, Delaware having a molecular weight of 300,000 and viscosity properties defined according to FIG. 2) | 3.2 |

The KLUCEL ®GF is dispersed in the liquid flavor composition of Example A with vigorous stirring, thereby resulting in a viscous liquid. 48.4 Parts by weight of the powder flavor composition of Example D is then blended into the said viscous liquid, with stirring at 25° C. for a period of 30 minutes, resulting in a thixotropic sustained release flavor paste.

EXAMPLE XXXIX

The following mixture is prepared:

| Ingredient | Parts by Weight |
|---|---|
| Liquid Flavor Composition of Example C | 48.4 |
| KLUCEL ® MF (brand of foodgrade hydroxypropyl cellulose manufactured by Hercules Corporation of Wilmington, Delaware having a molecular weight of 700,000 and viscosity properties defined according to FIG. 2) | 3.2 |

The KLUCEL ®MF is dispersed in the liquid flavor composition of Example A with vigorous stirring, thereby resulting in a viscous liquid. 48.4 Parts by weight of the powder flavor composition of Example D is then blended into the said viscous liquid, with stirring at 25° C. for a period of 30 minutes, resulting in a thixotropic sustained release flavor paste.

EXAMPLE XL

The following mixture is prepared:

| Ingredient | Parts by Weight |
|---|---|
| Liquid Flavor Composition of Example C | 48.4 |
| KLUCEL ® HF (brand of foodgrade | 3.2 |

-continued

| Ingredient | Parts by Weight |
|---|---|
| hydroxypropyl cellulose manufactured by Hercules Corporation of Wilmington, Delaware having a molecular weight of 800,000 and viscosity properties defined according to FIG. 2) | |

The KLUCEL®HF is dispersed in the liquid flavor composition of Example A with vigorous stirring, thereby resulting in a viscous liquid. 48.4 Parts by weight of the powder flavor composition of Example D is then blended into the said viscous liquid, with stirring at 25° C. for a period of 30 minutes, resulting in a thixotropic sustained release flavor paste.

EXAMPLE XLI

The following mixture is prepared:

| Ingredient | Parts by Weight |
|---|---|
| Liquid Flavor Composition of Example D | 48.4 |
| KLUCEL® EF (brand of foodgrade hydroxypropyl cellulose manufactured by Hercules Corporation of Wilmington, Delaware having a molecular weight of 50,000 and viscosity properties defined according to FIG. 2) | 3.2 |

The KLUCEL®EF dispersed in the liquid flavor composition of Example A with vigorous stirring, thereby resulting in a viscous liquid. 48.4 Parts by weight of the powder flavor composition of Example D is then blended into the said viscous liquid, with stirring at 25° C. for a period of 30 minutes, resulting in a thixotropic sustained release flavor paste.

EXAMPLE XLII

The following mixture is prepared:

| Ingredient | Parts by Weight |
|---|---|
| Liquid Flavor Composition of Example D | 48.4 |
| KLUCEL® LF (brand of foodgrade hydroxypropyl cellulose manufactured by Hercules Corporation of Wilmington, Delaware having a molecular weight of 100,000 and viscosity properties defined according to FIG. 2) | 3.2 |

The KLUCEL®LF is dispersed in the liquid flavor composition of Example A with vigorous stirring, thereby resulting in a viscous liquid. 48.4 Parts by weight of the powder flavor composition of Example D is then blended into the said viscous liquid, with stirring at 25° C. for a period of 30 minutes, resulting in a thixotropic sustained release flavor paste.

EXAMPLE XLIII 0.6 ml of an aqueous emulsion containing 37.5 mg per liter of the mixture of free flavor and entrapped flavor with suspension agent produced according to Example II are added to the contents of an infusion of tea of approximately 10 liters prepared by the decoction of 250 g of tea leaves followed by vigorous stirring. The tea has a solid content of 3 g per liter which means that it contains 0.75 ppm of aromatizing substance. The tea thus treated is then submitted to a jury of tasters and amateurs who, after blindfolding, have to indicate their preference between the aromatized tea and a non-aromatized reference tea of the same kind. 8 tasters out of 8 preferred the aromatized tea describing it as generally lemon-like. By way of comparison, similar aromatization in the quantity of 0.5 ppm produced the tea which is preferred by 4 tasters out of 5 and which was described as having a lemony note while aromatization in a quantity of 3.5 ppm in the unanimous opinion of the tasters gave the tea a strong aroma but still pleasant note.

EXAMPLE XLIV 0.6 ml of an aqueous emulsion containing 37.5 mg per liter of the mixture of free flavor and entrapped flavor with suspension agent produced according to Example II are added to the contents of an infusion of tea of approximately 10 liters prepared by the decoction of 250 g of tea leaves followed by vigorous stirring. The tea has a solid content of 3 g per liter which means that it contains 0.75 ppm of aromatizing substance. The tea thus treated is then submitted to a jury of tasters and amateurs who, after blindfolding, have to indicate their preference between the aromatized tea and a non-aromatized reference tea of the same kind. 8 tasters out of 8 preferred the aromatized tea describing it as generally peppermint-like. By way of comparison, similar aromatization in a quantity of 0.5 ppm produced the tea which is preferred by 4 tasters out of 5 and which was described as having a peppermint note while aromatization in a quantity of 3.5 ppm in the unanimous opinion of the tasters gave the tea a strong peppermint aroma but still pleasant note.

EXAMPLE XLV

The following mixture is prepared:

| Ingredient | Parts by Weight |
|---|---|
| Liquid Flavor Composition of Example B | 48.4 |
| KLUCEL® HF (Brand of hydroxypropyl cellulose manufactured by Hercules Corporation of Wilmington, Delaware having a molecular weight of 800,000 and viscosity properties as defined according to FIG. 2 (see note 1) | 6.4 |

NOTE 1
KLUCEL® is a brand of hydroxypropyl cellulose manufactered by the Hercules Corporation of Wilmington, Delaware having the structure:

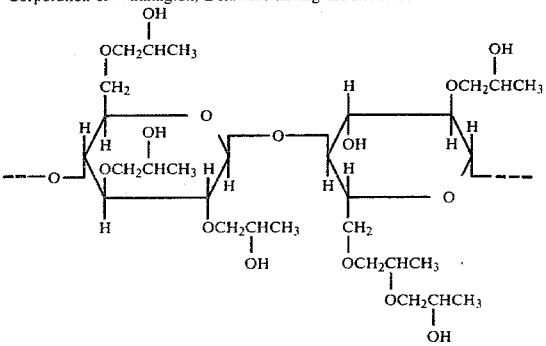

having a particle size such that 95% of the particles are passed through 30 mesh screens and 99% of the material is passed through 20 mesh screens.

The KLUCEL®HF is dispersed in the liquid flavor composition of Example A with vigorous stirring thereby resulting in a viscous liquid. 48.4 Parts by weight of the powder flavor composition of Example D is then blended into said viscous liquid with stirring at 25° C. for a period of 30 minutes resulting in a thixotropic sustained release flavor paste.

EXAMPLE XLVI 0.6 ml of an aqueous emulsion containing 37.5 mg per liter of the mixture of free flavor and entrapped flavor with suspension agent produced according to Example XLV are added to the contents of an infusion of tea of approximately 10 liters prepared by the decoction of 250 g of tea leaves followed by vigorous stirring. The tea has a solid content of 3 g per liter which means that it contains 0.75 ppm of aromatizing substance. The tea thus treated is then submitted to a jury of tasters and amateurs who, after blindfolding, have to indicate their preference between the aromatized tea and a non-aromatized reference tea of the same kind. 8 tasters out of 8 preferred the aromatized tea describing it as generally lemon-like. By way of comparison, similar aromatization in the quantity of 0.5 ppm produced the tea which is preferred by 4 tasters out of 5 and which was described as having a lemony note while aromatization in a quantity of 3.5 ppm in the unanimous opinion of the tasters gave the tea a strong aroma but still pleasant note.

EXAMPLE XLVI

The following mixture is prepared:

| Ingredient | Parts by Weight |
| --- | --- |
| Liquid flavor composition of Example XA | 48.4 |
| KLUCEL® JF (brand of foodgrade hydroxypropyl cellulose by Hercules Corporation of Wilmington, Delaware having a molecular weight of 120,000 and viscosity properties defined according to FIG. 2) | 3.2 |

The KLUCEL®JF is dispersed in the liquid flavor composition of Example XA with vigorous stirring thereby resulting in a viscous liquid. 48.4 Parts by weight of a powder flavor composition prepared as follows:

20 Grams of the flavor composition produced according to Example XA is emulsified in a solution containing 300 grams of gum acacia and 700 grams of water. The emulsion is spray-dried with a Bowen Lab Model Dryer utilizing 260 cfm of air with an inlet temperature of 500° F. an outlet temperature of 200° F. and a wheel speed of 50,000 rpm, is then blended into said viscous liquid with stirring at 25° C. for a period of 30 minutes resulting in a dry, free-flowing sustained release flavor powder having an excellent coffee flavor.

The resulting flavor powder is then added at the rate of 2% to Nescafe® brand of instant coffee manufactured by the Nestle Corporation of Basle, Switzerland. The resulting mixture is then added to boiling water at the rate of one teaspoon per standard cup of water. The resulting coffee flavor beverage is allowed to cool to 70° F. The resulting coffee has an excellent long lasting aroma of constant strength and an excellent long lasting taste of constant strength over a period of 15 minutes.

What is claimed is:

1. A process for producing a flavored consumable heated beverage wherein the flavor thereof is released at a high flavor intensity substantially evenly and uniformly over an extended period of time comprising the steps of:
    (i) preparing a flavor powder by admixing:
        (a) from about 3 up to about 7 parts by weight of a non-confined hydrophobic flavor oil;
        (b) from about 3 up to about 7 parts by weight of a hydrolytically releaseable flavor oil physically entrapped in an edible solid material selected from the group consisting of gelatin, dextrin, gum acacia and modified food starch, said solid material having a particle size of from about 5 microns up to about 400 microns, said physically entrapped flavor oil being organoleptically compatible with said non-confined hydrophobic flavor oil;
        (c) from about 0.1 up to about 1 part by weight of a solid suspending agent consisting of hydroxypropyl cellulose having a molecular weight of from about 50,000 up to about 800,000,
    whereby a free flowing sustained release flavor powder is formed;
    (ii) then intimately admixing the said flavor powder with an instant coffee or instant tea powder;
    (iii) then adding the resulting powder to boiling water;
    (iv) then allowing the resulting mixture to cool to a consumable temperature.

2. The process of claim 1 wherein the non-confined hydrophobic flavor oil and the entrapped flavor oil are tea flavor or tea leaf extract.

3. The process of claim 1 wherein the non-confined hydrophobic oil and the entrapped flavor oil are lemon flavor oils.

4. The process of claim 1 wherein the non-confined hydrophobic flavor oil and the entrapped flavor oil are coffee flavor or coffee bean extract.

5. The process of claim 1 wherein in addition to boiling water being added, edible ethanol is added to the intimately admixed flavor powder.

6. The process of claim 5 wherein the ratio of ethanol:water is 1:1.

* * * * *